(12) United States Patent
Pecora

(10) Patent No.: US 11,746,909 B2
(45) Date of Patent: Sep. 5, 2023

(54) VALVE GATES

(71) Applicant: ROMAC INDUSTRIES, INC., Bothell, WA (US)

(72) Inventor: Aaron David Pecora, Bothell, WA (US)

(73) Assignee: ROMAC INDUSTRIES, INC., Bothell, WA (US)

( * ) Notice: Subject to any disclaimer, the term of this patent is extended or adjusted under 35 U.S.C. 154(b) by 0 days.

(21) Appl. No.: 17/915,266

(22) PCT Filed: Mar. 30, 2021

(86) PCT No.: PCT/US2021/024964
§ 371 (c)(1),
(2) Date: Sep. 28, 2022

(87) PCT Pub. No.: WO2021/202585
PCT Pub. Date: Oct. 7, 2021

(65) Prior Publication Data
US 2023/0136377 A1    May 4, 2023

Related U.S. Application Data

(60) Provisional application No. 63/003,038, filed on Mar. 31, 2020.

(51) Int. Cl.
*F16K 3/18* (2006.01)
*F16L 55/105* (2006.01)
*F16K 31/50* (2006.01)

(52) U.S. Cl.
CPC ............ *F16K 3/184* (2013.01); *F16K 31/508* (2013.01); *F16K 3/186* (2013.01); *F16L 55/105* (2013.01)

(58) Field of Classification Search
CPC ........ F16K 3/186; F16K 3/184; F16K 31/508; F16L 55/105
See application file for complete search history.

(56) References Cited

U.S. PATENT DOCUMENTS 463,016 A * 11/1891 Vincent ................... F16K 3/186
                                                251/200
570,568 A * 11/1896 Sharar ..................... F16K 3/186
                                                251/200

(Continued)

FOREIGN PATENT DOCUMENTS

| JP | 2022052014 A | 4/2022 |
|---|---|---|
| RU | 2147704 | 4/2000 |
| RU | 2544911 C2 | 3/2015 |

OTHER PUBLICATIONS

U.S. Pipe, "SMITH Metropolitan Gate Valves," Operating Manual: V1-V-40, 1974. (42 pages).

*Primary Examiner* — David Colon-Morales
(74) *Attorney, Agent, or Firm* — SEED INTELLECTUAL PROPERTY LAW GROUP LLP

(57) ABSTRACT

A valve gate may include a threaded rod, a nut engaged with the threaded rod, a movable body mounted on the threaded rod, a seal, a pair of levers, and first and second housing components that at least partially enclose the other components. The threaded rod can be turned to drive translation of the nut and the movable body along the threaded rod. Translation of the movable body along the threaded rod can drive rotation of the levers outward away from the threaded rod, and rotation of the levers can force the seal to expand outward from the threaded rod. Such expansion can force the seal into engagement with an inner surface of a pipeline.

33 Claims, 25 Drawing Sheets

(56) References Cited

U.S. PATENT DOCUMENTS

| | | | |
|---|---|---|---|
| 834,878 A * | 11/1906 | Anderson | F16K 3/186 251/167 |
| 1,650,969 A * | 11/1927 | Thoman | F16K 3/186 251/200 |
| 2,042,067 A | 5/1936 | Leach et al. | |
| 2,272,734 A | 2/1942 | Witt | |
| 2,285,392 A * | 6/1942 | Cline | F16L 55/124 138/94 |
| 2,771,096 A | 11/1956 | Ver Nooy | |
| 2,895,709 A * | 7/1959 | Frieda | F16K 3/184 251/266 |
| 2,913,012 A | 11/1959 | McCurley | |
| 2,988,111 A | 6/1961 | Ver Nooy | |
| 3,115,163 A | 12/1963 | Van Epps et al. | |
| 3,170,226 A | 2/1965 | Timothy | |
| 3,766,947 A | 10/1973 | Osburn | |
| 3,837,617 A | 9/1974 | Eminger et al. | |
| 3,991,791 A | 11/1976 | Luckenbill | |
| 4,344,460 A | 8/1982 | Galos | |
| 4,541,613 A | 9/1985 | Barbe | |
| 4,706,934 A | 11/1987 | Brown | |
| 5,074,526 A | 12/1991 | Ragsdale et al. | |
| 5,186,199 A | 2/1993 | Murphy et al. | |
| 5,690,139 A | 11/1997 | Murphy et al. | |
| 6,283,446 B1 | 9/2001 | Sato et al. | |
| 6,776,184 B1 * | 8/2004 | Maichel | F16L 55/105 251/327 |
| 6,810,903 B1 | 11/2004 | Murphy et al. | |
| 6,893,001 B2 | 5/2005 | Maenishi | |
| 7,073,776 B2 | 7/2006 | Mori | |
| 7,225,827 B2 * | 6/2007 | Maichel | F16L 55/105 251/327 |
| 7,819,384 B2 * | 10/2010 | Nakano | F16K 3/186 251/193 |
| 8,627,843 B2 * | 1/2014 | Ries | F16L 55/105 251/193 |
| 8,695,626 B2 | 4/2014 | Murphy et al. | |
| 9,638,336 B2 | 5/2017 | Murphy et al. | |
| 9,644,779 B2 | 5/2017 | Vazzana et al. | |
| 9,759,333 B2 | 9/2017 | Munetomo et al. | |
| 9,829,141 B2 | 11/2017 | Vazzana et al. | |
| 10,619,747 B2 | 4/2020 | Vazzana et al. | |

* cited by examiner

VALVE GATES

BACKGROUND

Technical Field

The present disclosure relates generally to valve gates configured to be used to seal pipes or other conduits, such as against the flow of water or other liquids, and more particularly to valve gates configured to be inserted into a pipe through an opening in an outer wall thereof.

Description of the Related Art

Fluidic valves, such as pneumatic or hydraulic valves, are very old technologies that are still being improved upon today. Many new pipeline systems are built with valves pre-installed therein, to allow operator(s) to control the flow of fluids through the various conduits thereof. In some cases, existing pipeline systems are updated or retrofitted to include additional, newer valves, to provide additional control options. In many cases, retrofitting existing municipal pipelines requires dewatering the pipeline, including shutting off water to a neighborhood and disinfecting the pipeline, before installation of new components such as valves can begin. Such dewatering operations can be expensive, time-consuming, and burdensome to those living in affected areas. Thus, live pipeline valve insertion, which allows a valve to be installed within a pipeline while the pipeline is operating (that is, without dewatering the pipeline) provides significant advantages.

Live pipeline valve insertion typically includes mounting a tapping sleeve over an existing live pipeline within which a valve is to be installed. Once the tapping sleeve has been properly mounted to the pipeline, additional components, such as cutting and/or reaming components, may be used within the tapping sleeve to create an opening or aperture in the pipeline suitable for installation of the valve. Once the opening has been formed, a valve including a valve gate may in positioned within the tapping sleeve and in proximity to the opening so that the valve gate can be inserted into the pipeline through the opening to seal or close the pipeline, and so that the valve gate can be retracted from the pipeline through the opening to un-seal or open the pipeline. Systems for live pipeline valve insertion are commercially available, such as from ROMAC INDUSTRIES, INC. under the names QUIKVALVE and INSERTAVALVE.

BRIEF SUMMARY

A valve gate may be summarized as comprising: a rod having a central longitudinal axis, a proximal end along the central longitudinal axis, and a distal end opposite the proximal end along the central longitudinal axis; a movable body coupled to the rod such that the movable body can move distally with respect to the rod; a seal coupled to the movable body; a first lever located between the rod and a first portion of the seal and engaged with the movable body and the first portion of the seal such that distal movement of the movable body drives the first lever to rotate and push the first portion of the seal outward away from the rod in a first direction transverse to the central longitudinal axis; and a second lever located between the rod and a second portion of the seal and engaged with the movable body and the second portion of the seal such that distal movement of the movable body drives the second lever to rotate and push the second portion of the seal outward away from the rod in a second direction transverse to the central longitudinal axis.

The rod may be located between the first lever and the second lever. The first direction transverse to the central longitudinal axis may be opposite to the second direction transverse to the central longitudinal axis.

A valve gate may be summarized as comprising: a rod having a central longitudinal axis, a proximal end along the central longitudinal axis, and a distal end opposite the proximal end along the central longitudinal axis; a movable body coupled to the rod such that the movable body can move distally with respect to the rod; a seal coupled to the movable body; and a lever located between the rod and the seal and engaged with the movable body and a portion of the seal such that distal movement of the movable body drives the lever to rotate and push the portion of the seal outward away from the rod in a direction transverse to the central longitudinal axis.

The movable body may include a wedge and the lever may be engaged with the wedge. The movable body may include a socket and the lever may be seated within the socket. The seal may have a first end coupled to the movable body, a second end opposite the first end coupled to the movable body, and an intermediate portion between the first and second ends that wraps around a distal end of the valve gate. The rod may be threadedly engaged with the movable body such that rotation of the rod in a first direction about the central longitudinal axis drives proximal movement of the movable body and rotation of the rod in a second direction opposite the first direction about the central longitudinal axis drives distal movement of the movable body. Distal movement of the movable body may drive the lever to rotate about a fulcrum. The fulcrum may be located at a distal end of the lever. The fulcrum may be located at a proximal end of the lever. Distal movement of the movable body may drive the lever to rotate about an axis transverse or perpendicular to the central longitudinal axis. The movable body may be coupled to the rod such that the movable body can move in a direction parallel to the central longitudinal axis with respect to the rod.

The valve gate may further comprise: a first housing component that has an internal surface that faces toward a first side of the rod, a first side of the movable body, a first side of the seal, and a first side of the lever; and a second housing component that has an internal surface that faces toward a second side of the rod opposite the first side of the rod, a second side of the movable body opposite the first side of the movable body, a second side of the seal opposite the first side of the seal, and a second side of the lever opposite the first side of the lever. The first housing component may include a projection that extends outward from the internal surface of the first housing component, and the projection may have a curved, proximal-facing surface that provides a fulcrum for the lever such that the lever is configured to pivot on the curved surface of the projection. The first housing component may include a projection that extends outward from the internal surface of the first housing component, and the projection may have a wedge engaged with the lever.

At least one of the first housing component and the second housing component may have an external surface opposite the respective internal surface and a second seal coupled to the external surface such that when the valve gate is inserted into a pipeline through an opening cut into the pipeline, the second seal engages with a portion of the opening. The at least one of the first housing component and the second housing component may be exactly one of the first housing component and the second housing component. The portion of the opening may be a downstream portion of the opening. The movable body may include an undercut groove and the seal may be securely retained within the undercut groove of the movable body.

The valve gate may be configured to seal a first conduit having a first inner diameter and configured to seal a second conduit having a second inner diameter, wherein the first inner diameter is different than the second inner diameter. The valve gate may be configured to be inserted into the first conduit through a first opening in the first conduit, wherein the first opening has a third inner diameter smaller than the first inner diameter, and the valve gate may be configured to be inserted into the second conduit through a second opening in the second conduit, wherein the second opening has a fourth inner diameter smaller than the second inner diameter. The first inner diameter may be greater than the second inner diameter by at least one eighth or one quarter of an inch.

The valve gate may be located inside a tapping sleeve. The valve gate may be configured to seal a conduit having a second central longitudinal axis such that the direction transverse to the central longitudinal axis of the rod is transverse to the second central longitudinal axis of the conduit. The valve gate may be configured to seal a conduit having a second central longitudinal axis such that the direction transverse to the central longitudinal axis of the rod is aligned with the second central longitudinal axis of the conduit. The valve gate may be configured to form a seal with at least a portion of a radially-facing inner circumferential surface of a pipe. The valve gate may be configured to form a seal with at least a portion of an axially-facing end surface of a pipe.

DETAILED DESCRIPTION

In the following description, certain specific features are set forth in order to provide a thorough understanding of various embodiments of the invention. However, one skilled in the art will understand that the invention may be practiced with a subset of such features or with any desired combination of such features.

Figure 1:
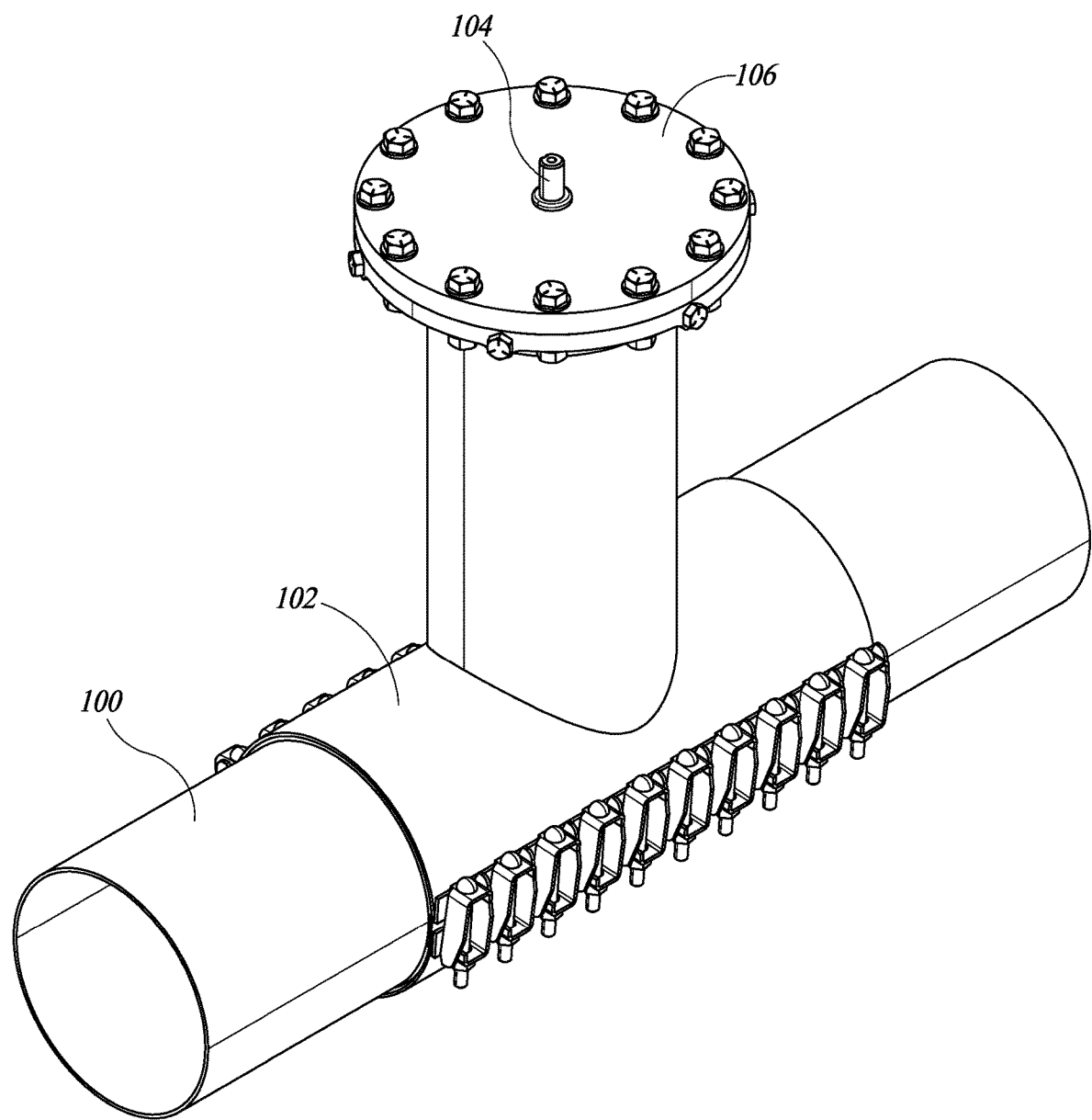
FIG. 1 illustrates a perspective view of a valve gate installed within a tapping sleeve mounted to a pipeline.
Figure 2:
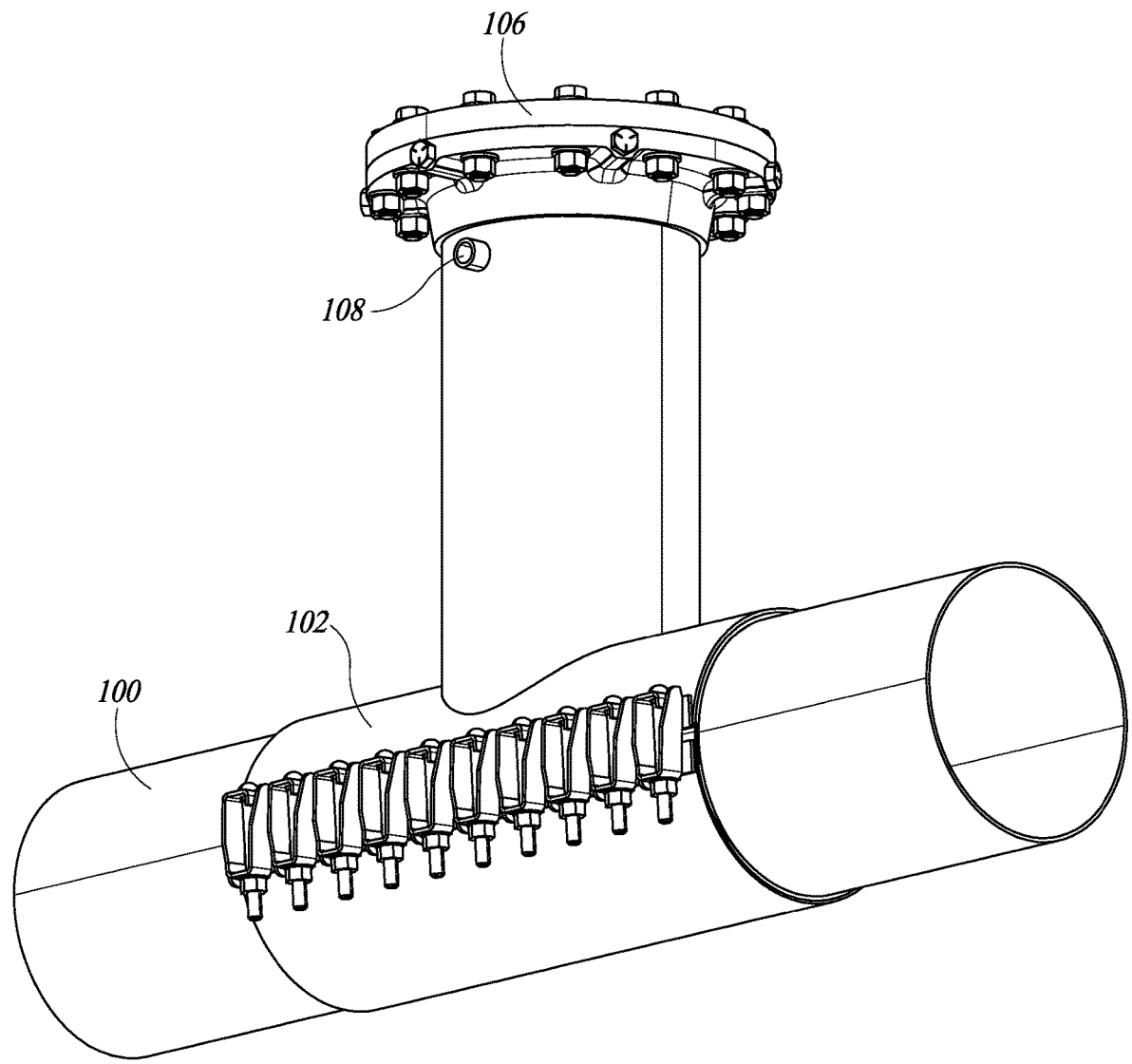
FIG. 2 illustrates another perspective view of the valve gate installed within the tapping sleeve mounted to the pipeline illustrated in FIG. 1.
Figure 3:
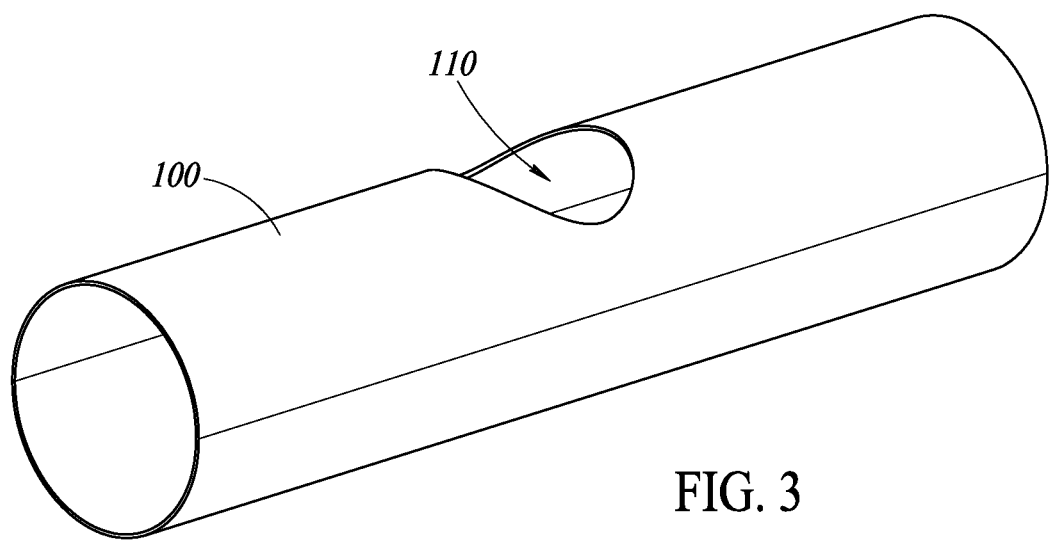
FIG. 3 illustrates a perspective view of the pipeline shown in FIGS. 1 and 2 with other components, including the valve gate and tapping sleeve, removed.
Figure 4:
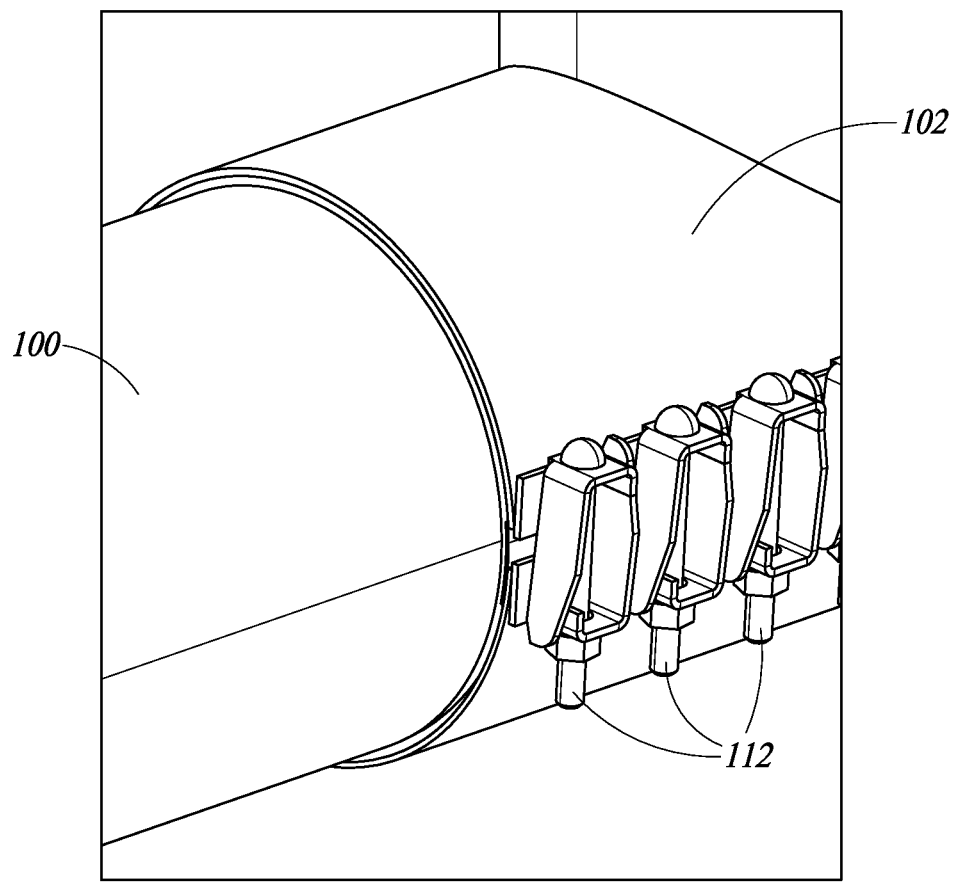
FIG. 4 illustrates a perspective view of a portion of the tapping sleeve and the pipeline shown in FIGS. 1 and 2 at a larger scale.

FIG. 1 illustrates a pipeline 100 and a tapping sleeve 102 mounted to and installed on the pipeline 100. FIG. 1 also illustrates that an uppermost portion of a valve gate 104 protrudes outward through a flange 106 at a terminal end portion of the tapping sleeve 102 distal from the pipeline 100. FIG. 2 illustrates another view of the pipeline 100 and tapping sleeve 102, and shows that the tapping sleeve 102 includes a port 108 through which fluids such as liquids or gases can be provided to or removed from an interior of the tapping sleeve 102, such that, for example, fluid pressures within the tapping sleeve 102 can be controlled (e.g., increased or decreased) by moving fluids into or out of the tapping sleeve 102 through the port 108. FIG. 3 illustrates the pipeline 100 by itself and shows that an aperture, hole, or opening 110 has been cut into and formed within an outer wall of the pipeline 100. FIG. 4 illustrates a portion of the pipeline 100 and the tapping sleeve 102 at a larger scale, showing a portion of a mechanism that securely couples the tapping sleeve 102 to the pipeline 100.

As illustrated in FIGS. 1-4, the pipeline 100 has an opening 110 formed in an outer wall thereof, through which the valve gate 104 can be moved. For example, the valve gate 104 can be moved toward and into the pipeline 100 through the opening 110 to seal and close the pipeline 100 at the location of the opening 110, and the valve gate 104 can be moved away from and out of the pipeline 100 through the opening 110 to un-seal and open the pipeline 100 at the location of the opening 110. As illustrated in FIG. 3, the pipeline 100 has a hollow cylindrical shape that has a central longitudinal axis, and the opening 110 has a circular shape with its own central longitudinal axis that is perpendicular to the central longitudinal axis of the pipeline 100. Thus, the resulting three-dimensional shape of the edge or periphery of the opening 110 forms a saddle shape defined by the geometry (including the diameter) of both the pipeline 100 and the opening 110.

As illustrated in FIG. 3, a diameter of the opening 110 is substantially smaller than an inner diameter of the pipeline 100. It may be advantageous to make the diameter of the opening 110 as small as feasible, and as much smaller than the inner diameter of the pipeline 100 as feasible, under the circumstances. For example, in some cases it is easier, less expensive, and less time-consuming to form a smaller opening than a larger opening in the pipeline 100. As another example, cutting an opening into the wall of the pipeline 100 generally weakens the pipeline 100 at the location of the opening 110, and a smaller opening 110 generally reduces the overall strength of the pipeline 100 at the location of the opening 110 by less than a larger opening would. As one further example, making the opening 110 smaller leaves more of the inner surface of the pipeline 100 intact and available for the valve gate 104 to engage with and form a seal with. In practice, however, the diameter of the opening 110 will be driven by the size of the valve gate 104 to be inserted through the opening 110. For example, a single valve gate 104 may be configured for use with pipelines 100 of different diameters. In such cases, even though the pipelines 100 have different diameters, an opening 110 in any one of the pipelines 100 may have the same size, to accommodate the dimensions of the single valve gate 104.

As also illustrated in FIGS. 1-4, the tapping sleeve 102 includes a plurality of bolts or other mechanical fasteners 112 that couple an upper portion of the tapping sleeve 102 (i.e., a portion of the tapping sleeve 102 that extends away from the pipeline 100, which may also be referred to herein as a front portion of the tapping sleeve 102) to a lower portion of the tapping sleeve (i.e., a portion of the tapping sleeve 102 opposite to the upper or front portion thereof, which may also be referred to herein as a rear portion of the tapping sleeve 102). As illustrated in FIG. 4, the fasteners 112 may include bolts that can be tightened to couple the tapping sleeve 102 to the pipeline 100 and increase a pressure exerted by the tapping sleeve 102 on the outer surface of the pipeline 100, which improves a fluid seal, such as a gaseous and/or liquid seal, between an inner surface of the tapping sleeve 102 and the outer surface of the pipeline 100, and that can be loosened to decrease a pressure exerted by the tapping sleeve 102 on the outer surface of the pipeline 100 and to de-couple the tapping sleeve 102 from the pipeline 100.

Figure 5:
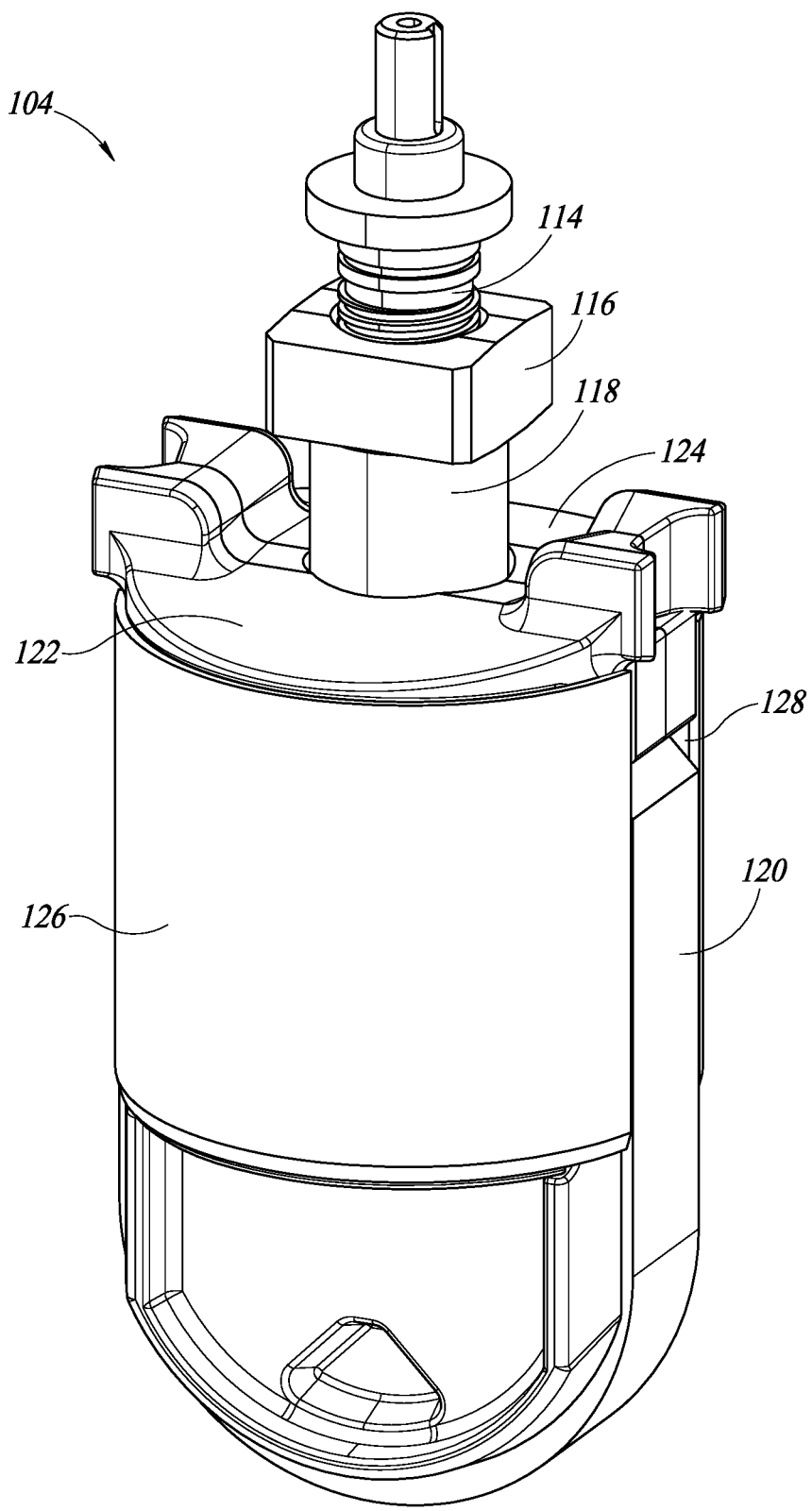
FIG. 5 illustrates a perspective view of a valve gate.

FIGS. 5-18 illustrate additional features of the valve gate 104. For example, FIGS. 5-8 illustrate various features of the valve gate 104 from a single consistent perspective view. In particular, FIG. 5 illustrates all components of the valve gate 104 in an assembled state, while FIGS. 6-8 each illustrate less than all components of the valve gate 104 so that additional features are revealed. As illustrated in FIG. 5, the valve gate 104 includes a threaded rod 114, a threaded square nut 116, a spacer or load transfer or movable body 118, a first seal 120, a first housing component or portion of a housing 122, which may be an upstream portion of a housing 122, a second housing component or portion of a housing 124, which may be a downstream portion of a housing 124, a second seal 126, which may be an upstream seal 126, and a third seal 128, which may be a downstream seal 128.

While some components of the valve gate 104 are referred to herein as "upstream" or "downstream" components, the valve gate 104 can, in practice, be used to seal the pipeline 100 in either direction, e.g., such that components of the valve gate referred to as "upstream" components are in fact located upstream with respect to a direction of fluid flow through the pipeline 100 or such that components of the valve gate referred to as "upstream" components are in fact located downstream with respect to a direction of fluid flow through the pipeline 100, and such that components of the valve gate referred to as "downstream" components are in fact located upstream with respect to a direction of fluid flow through the pipeline 100, or such that components of the valve gate referred to as "downstream" components are in fact located downstream with respect to a direction of fluid flow through the pipeline 100.

When the valve gate 104 is inserted into the pipeline 100 through the opening 110, the first seal 120 can be pushed outward from the rest of the valve gate 104, as described further elsewhere herein, until it engages with a radially- and inwardly-facing inner surface of the pipeline 100 to engage the valve gate 104 with the pipeline 100 and create a seal between the valve gate 104 and the pipeline 100. Thus, when the valve gate 104 is inserted into the pipeline 100 and viewed along the central longitudinal axis of the pipeline 100, the upstream and downstream seals 126, 128 form front and rear portions of the valve gate 104 and the first seal 120 forms an outer peripheral portion of the valve gate 104, and outward movement of the first seal 120 to engage with the inner surface of the pipeline 100 is generally radial movement of portions of the first seal 120.

Furthermore, when the valve gate 104 is inserted into the pipeline 100 and viewed along a central longitudinal axis of the threaded rod 114, which may be coincident with the central longitudinal axis of the opening 110 formed in the pipeline 100, the upstream and downstream seals 126, 128 form outer peripheral portions of the valve gate 104 such that the valve gate 104 has a generally circular outer peripheral shape, for example with a first, upstream semi-circular portion thereof formed by the outer peripheral surface of the upstream seal 126, and a second, downstream semi-circular portion thereof formed by the outer peripheral surface of the downstream seal 128. This generally circular outer peripheral shape of the valve gate 104 and the upstream and downstream semi-circular portions thereof can have shapes and dimensions configured to engage with and seat snugly against the inner surface formed by the opening 110 in the pipeline 100.

For example, the semi-circular outer peripheral shape of the upstream seal 126 when viewed along the central longitudinal axis of the threaded rod 114 may have a diameter or a radius of curvature that matches, corresponds to, or is the same as a diameter or a radius of curvature of the opening 110 when it is viewed along the central longitudinal axis of the threaded rod 114, and the semi-circular outer peripheral shape of the downstream seal 128 when viewed along the central longitudinal axis of the threaded rod 114 may have a diameter or a radius of curvature that matches, corresponds to, or is the same as a diameter or a radius of curvature of the opening 110 when it is viewed along the central longitudinal axis of the threaded rod 114. Furthermore, a length of the upstream seal 126 in a direction aligned with or parallel to the central longitudinal axis of the threaded rod 114 is at least as long as an overall height of the three-dimensional saddle shape of the opening 110 in a direction aligned with or parallel to the central longitudinal axis of the threaded rod 114, and a length of the downstream seal 128 in a direction aligned with or parallel to the central longitudinal axis of the threaded rod 114 is at least as long as an overall height of the three-dimensional saddle shape of the opening 110 in a direction aligned with or parallel to the central longitudinal axis of the threaded rod 114.

Thus, when the valve gate 104 is inserted into the pipeline 100 through the opening 110, the upstream seal 126 can engage with and create a seal against an upstream portion of the inner surface formed by the opening 110, and the downstream seal 128 can engage with and create a seal against a downstream portion of the inner surface formed by the opening 110. In practice, when the valve gate 104 is inserted into the pipeline 100 to seal the pipeline, the fluid within the pipeline 100 exerts a pressure against the valve gate 104 that urges or biases the valve gate 104 in a downstream direction and toward the downstream portion of the inner surface formed by the opening 110. Thus, a seal formed between the upstream seal 126 and the upstream portion of the inner surface formed by the opening 110 has different characteristics than a seal formed between the downstream seal 128 and the downstream portion of the inner surface formed by the opening 110.

In some cases, as an example, no seal is formed at all on the upstream side of the valve gate 104, as the fluid pressure makes forming such a seal more difficult or complicated but assists in forming a seal on the downstream side of the valve gate 104. Thus, in some implementations, the upstream seal 126 has different properties, such as different dimensions or different material properties, than the downstream seal 128. In some implementations, the upstream seal 126 is larger than and/or made of different material(s) than the downstream seal 128. In some implementations, the upstream seal 126 may be omitted from the valve gate 104 entirely such that no seal is formed during operation between the valve gate 104 and the upstream portion of the inner surface formed by the opening 110.

Figure 6:
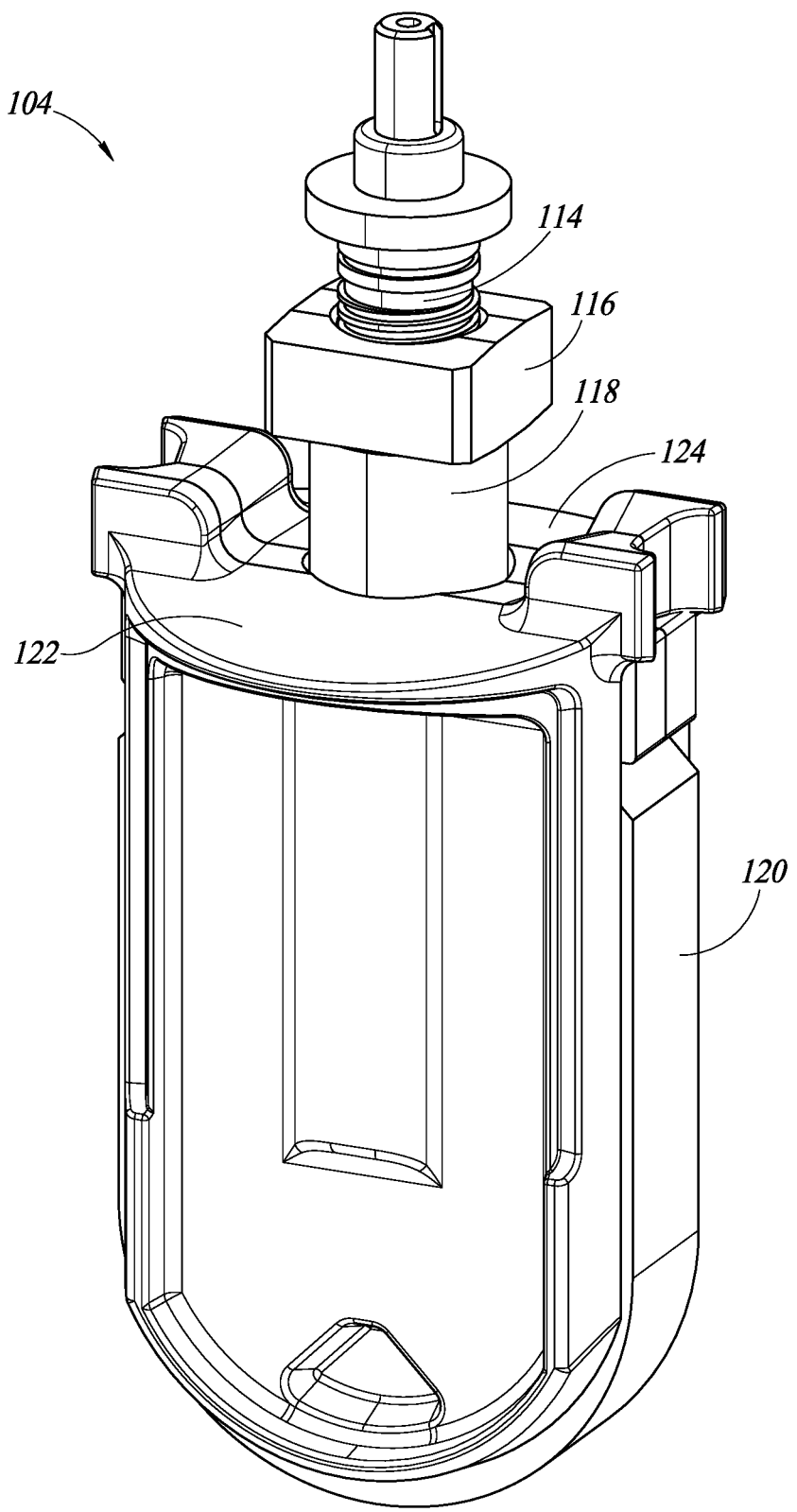
FIG. 6 illustrates a perspective view of the valve gate of FIG. 5 with seal components removed.
Figure 7:
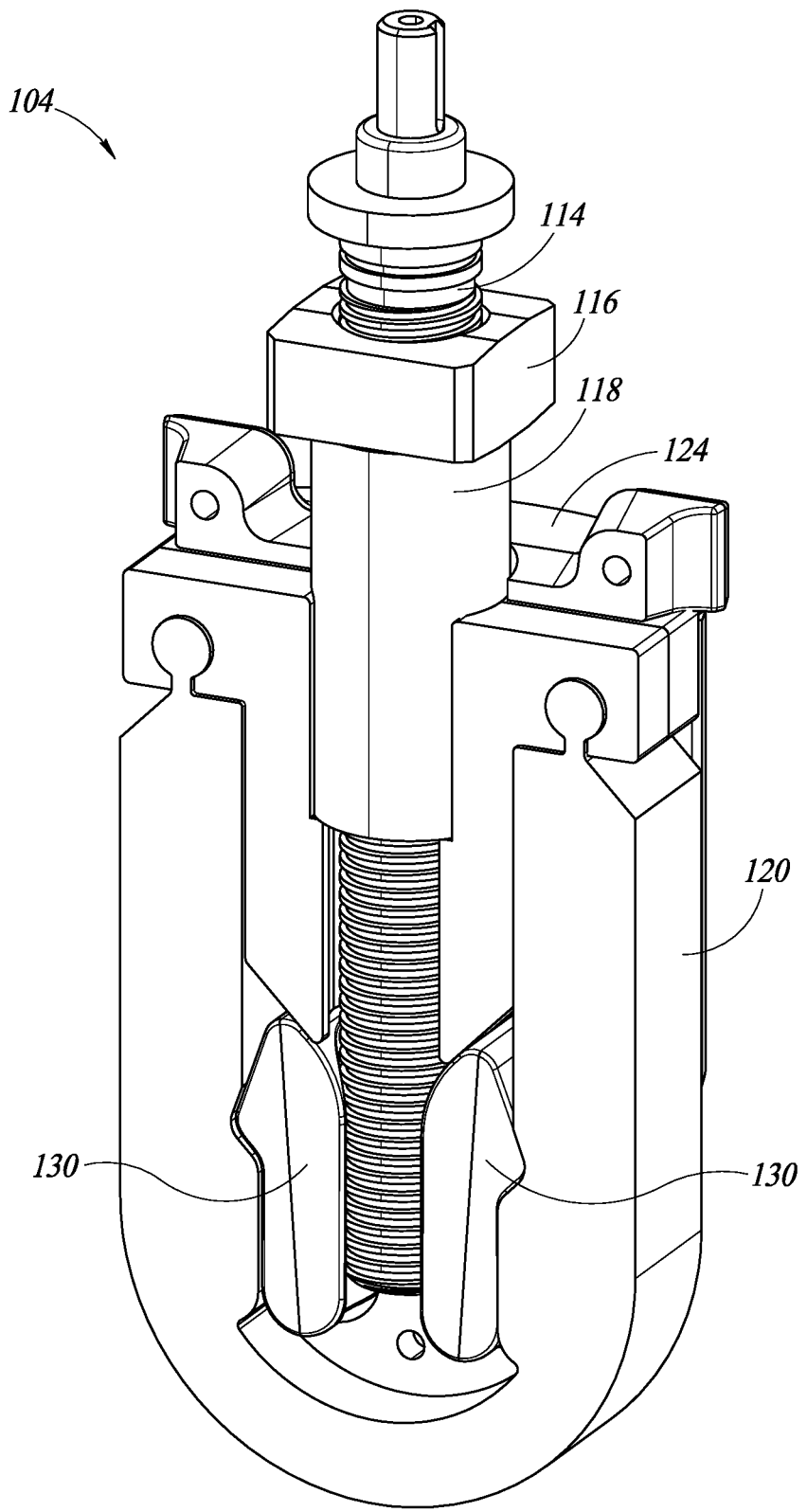
FIG. 7 illustrates a perspective view of the valve gate of FIG. 5 with seal components and a portion of a housing removed.
Figure 8:
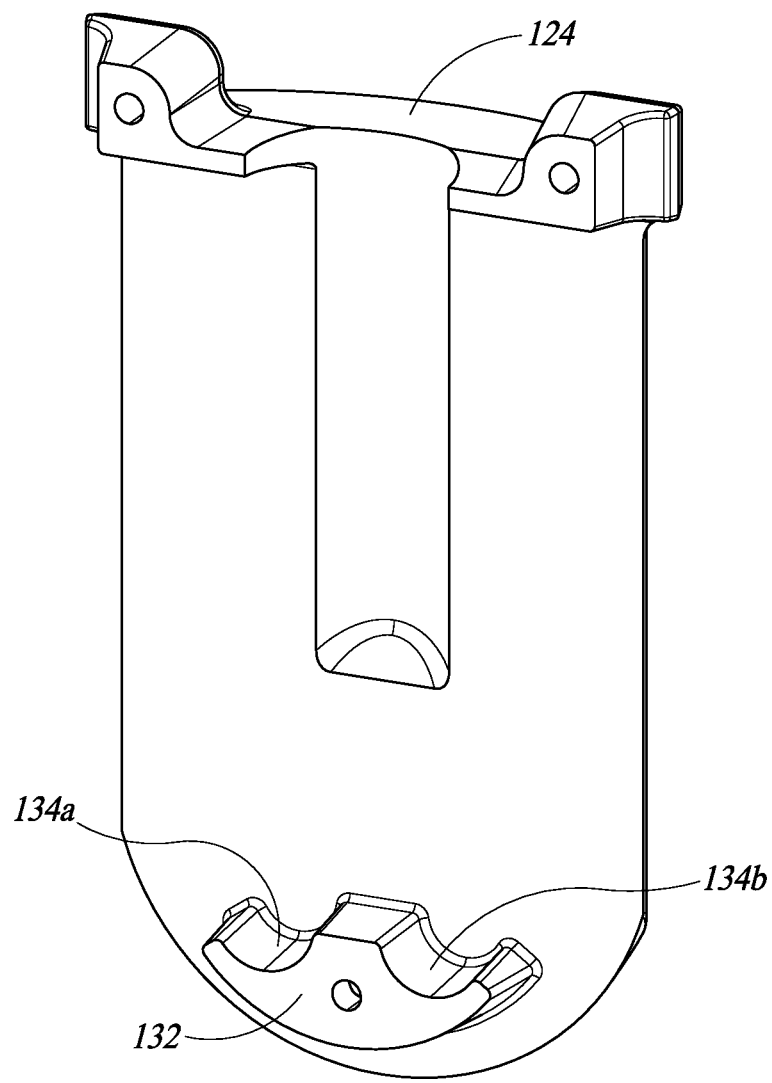
FIG. 8 illustrates a perspective view of a portion of a housing of the valve gate of FIG. 5.

FIG. 6 illustrates the valve gate 104 with the upstream and downstream seals 126, 128 removed such that additional features of the upstream portion of the housing 122, such as a contour of an outer surface thereof, are shown. FIG. 7 illustrates the valve gate 104 with the upstream and downstream seals 126, 128, and the upstream portion of the housing 122 removed such that additional features of the valve gate 104, such as of the threaded rod 114, the nut 116, the movable body 118, the first seal 120, and a pair of levers 130 thereof are shown. FIG. 8 illustrates the downstream portion of the housing 124 by itself and shows that the downstream portion of the housing 124 includes a protrusion 132 that extends inwardly and in an upstream direction from an inner or upstream surface of the downstream portion of the housing 124.

As illustrated in FIG. 8, when the valve gate 104 is located within the pipeline 100 and the downstream portion of the housing 124 and the protrusion 132 are viewed along the central longitudinal axis of the pipeline 100, the protrusion 132 includes a pair of sockets 134a, 134b, each of which includes a curved bearing surface. In particular, when viewed along the central longitudinal axis of the pipeline 100, the first socket 134a is spaced apart from the central longitudinal axis of the threaded rod 114 by a first distance in a first direction, and the second socket 134b is spaced apart from the central longitudinal axis of the threaded rod 114 by a second distance, which may be the same as the first distance, in a second direction, which may be opposite to the first direction. Each of the sockets 134a, 134b includes a bearing surface that extends linearly in a direction along a respective axis aligned with or parallel to the central longitudinal axis of the pipeline 100, and that is curved about such respective axes. Thus, each of the sockets 134a, 134b forms a respective channel or cup oriented to face upward toward the nut 116 when the valve gate 104 is assembled. Each of the sockets 134a, 134b can form a respective fulcrum for a respective one of the levers 130 when the valve gate 104 is assembled and in use, as described further elsewhere herein. In some embodiments, the levers 130 may be mounted in the sockets 134a, 134b on axles.

Figure 9:
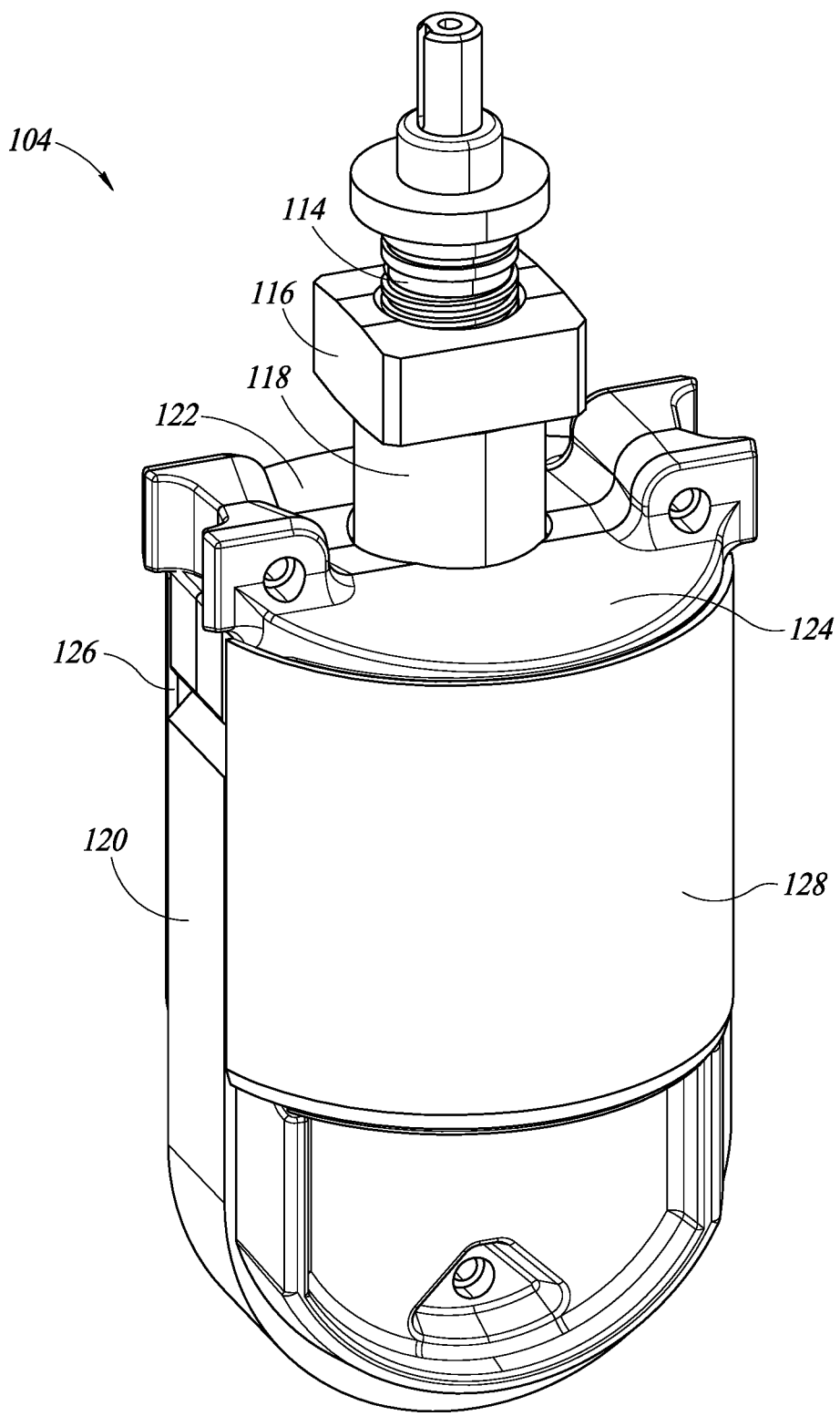
FIG. 9 illustrates another perspective view of the valve gate of FIG. 5.

FIGS. 9-12 illustrate various features of the valve gate 104 from a single consistent perspective, which is different than the perspective used in FIGS. 5-8. In particular, FIG. 9 illustrates all components of the valve gate 104 in an assembled state, while FIGS. 10-12 each illustrate less than all components of the valve gate 104 so that additional features are revealed.

Figure 10:
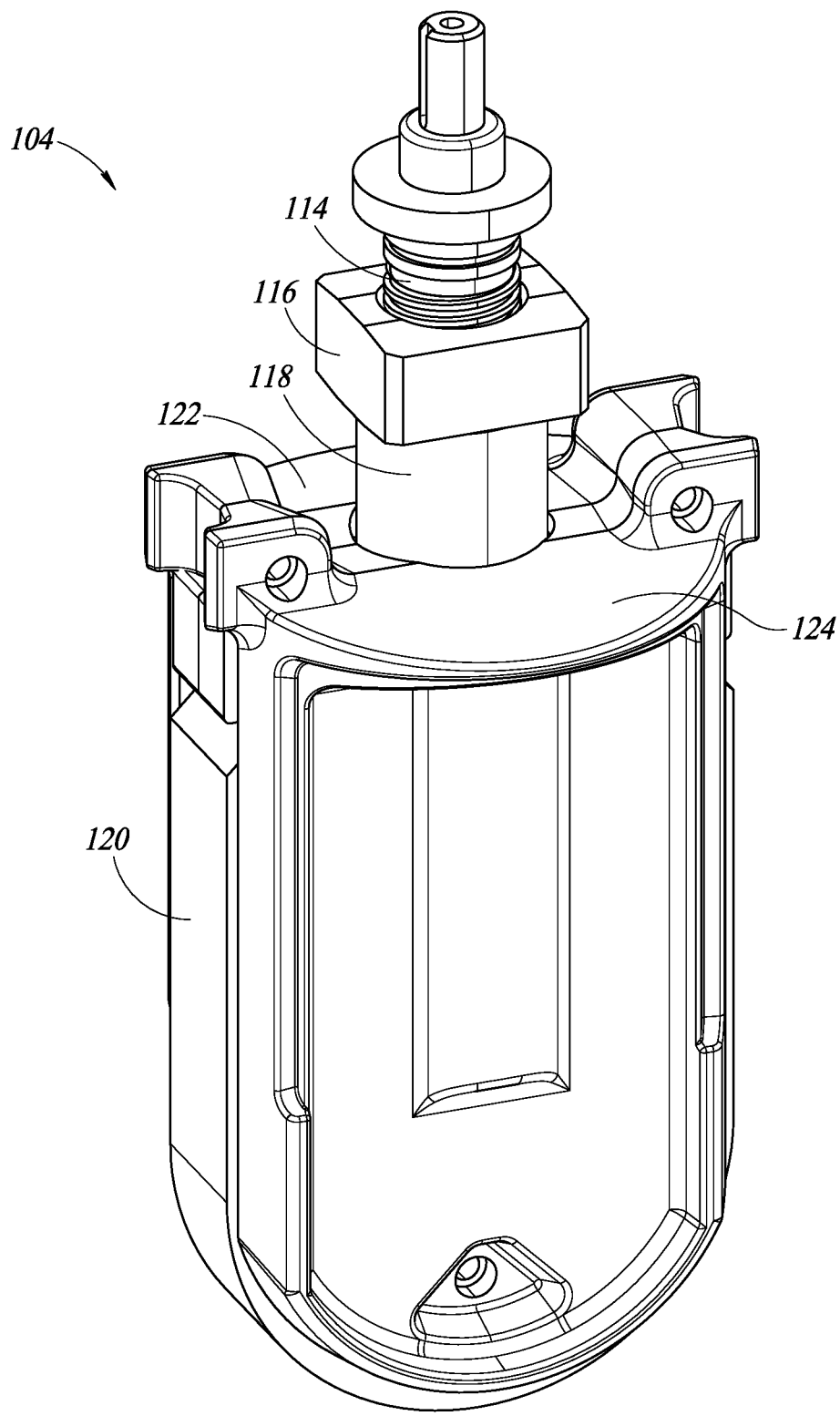
FIG. 10 illustrates another perspective view of the valve gate of FIGS. 5 and 9 with seal components removed.
Figure 11:
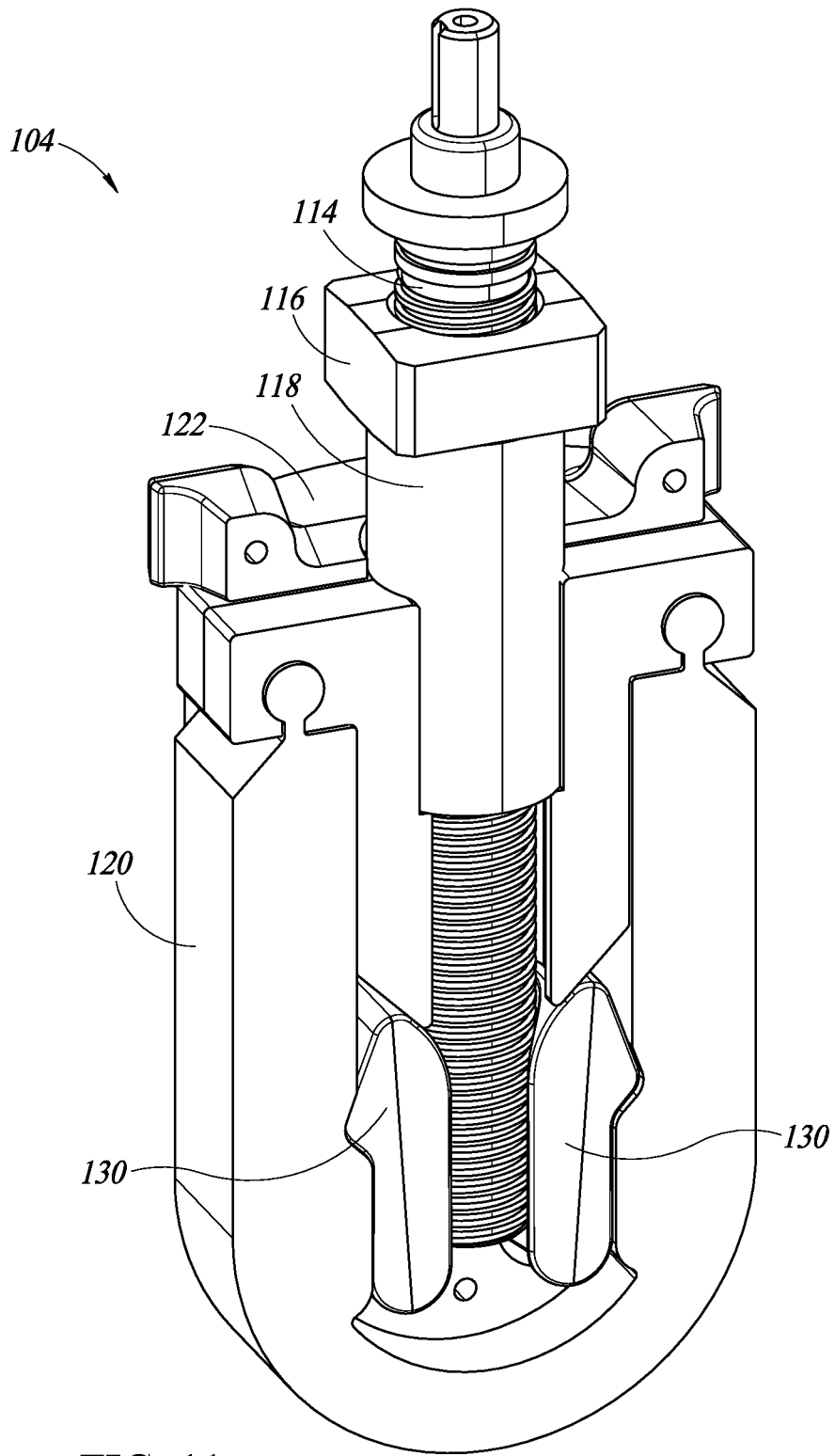
FIG. 11 illustrates another perspective view of the valve gate of FIGS. 5 and 9 with seal components and a portion of a housing removed.
Figure 12:
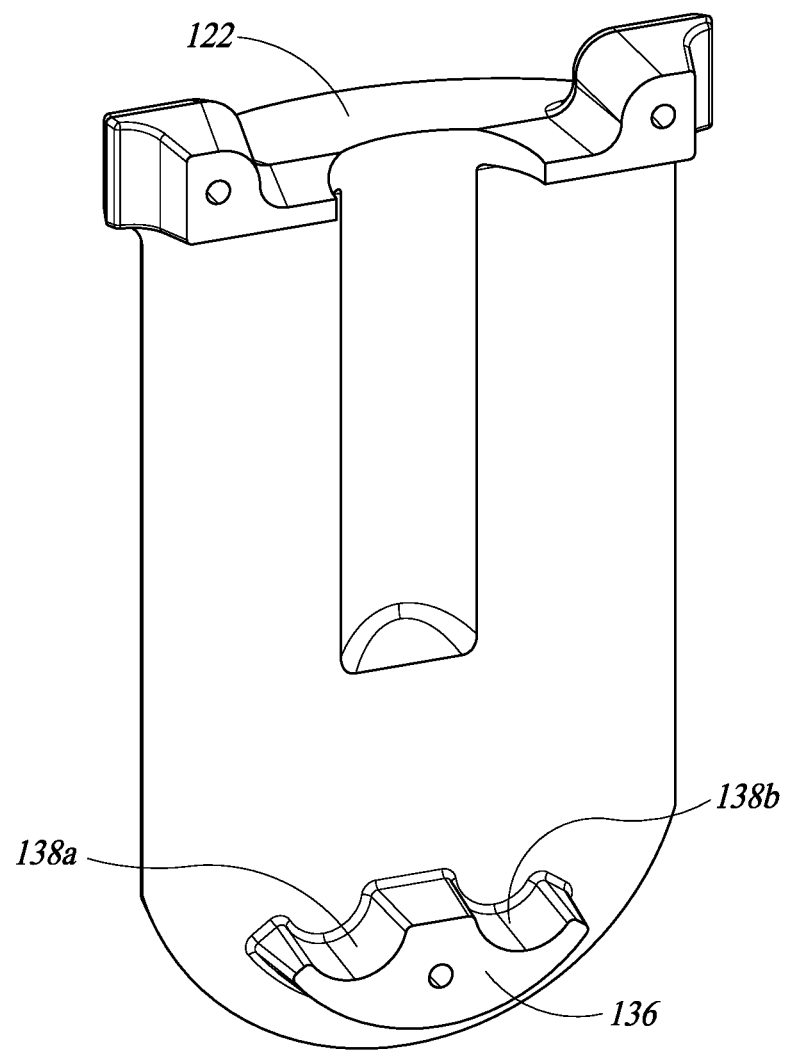
FIG. 12 illustrates a perspective view of a portion of a housing of the valve gate of FIGS. 5 and 9.

FIG. 10 illustrates the valve gate 104 with the upstream and downstream seals 126, 128 removed such that additional features of the downstream portion of the housing 124, such as a contour of an outer surface thereof, are shown. FIG. 11 illustrates the valve gate 104 with the upstream and downstream seals 126, 128, and the downstream portion of the housing 124 removed such that additional features of the valve gate 104, such as of the threaded rod 114, the nut 116, the movable body 118, the first seal 120, and the pair of levers 130 are shown. FIG. 12 illustrates the upstream portion of the housing 122 by itself and shows that the upstream portion of the housing 122 includes a protrusion 136 that extends inwardly and in a downstream direction from an inner or downstream surface of the upstream portion of the housing 122.

As illustrated in FIG. 12, when the valve gate 104 is located within the pipeline 100 and the upstream portion of the housing 122 and the protrusion 136 are viewed along the central longitudinal axis of the pipeline 100, the protrusion 136 includes a pair of sockets 138a, 138b, each of which includes a curved bearing surface. In particular, when viewed along the central longitudinal axis of the pipeline 100, the first socket 138a is spaced apart from the central longitudinal axis of the threaded rod 114 by a first distance in a first direction (which may be the same as the first distance and first direction, respectively, described with respect to the protrusion 132), and the second socket 138b is spaced apart from the central longitudinal axis of the threaded rod 114 by a second distance, which may be the same as the first distance, in a second direction, which may be opposite to the first direction (and which may be the same as the second distance and second direction, respectively, described with respect to the protrusion 132). Each of the sockets 138a, 138b includes a bearing surface that extends linearly in a direction along a respective axis aligned with or parallel to the central longitudinal axis of the pipeline 100, and that is curved about such respective axes. Thus, each of the sockets 138a, 138b forms a respective channel or cup oriented to face upward toward the nut 116 when the valve gate 104 is assembled. Each of the sockets 138a, 138b can form a respective fulcrum for a respective one of the levers 130 when the valve gate 104 is assembled and in use, as described further elsewhere herein. In some embodiments, the levers 130 may be mounted in the sockets 138a, 138b on axles.

Figure 13:
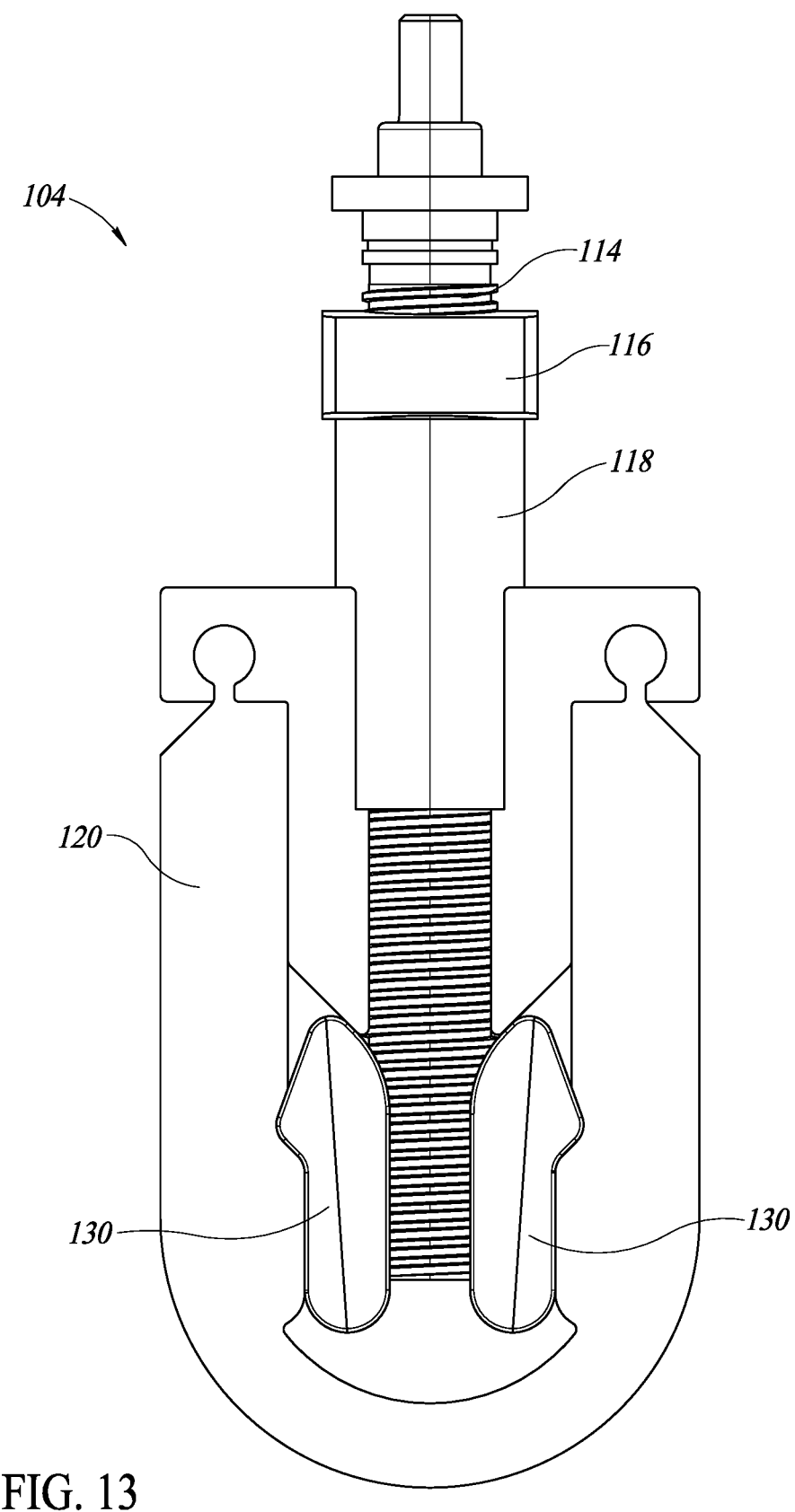
FIG. 13 illustrates a front view of the valve gate of FIGS. 5 and 9 with a seal and two portions of a housing removed.
Figure 14:
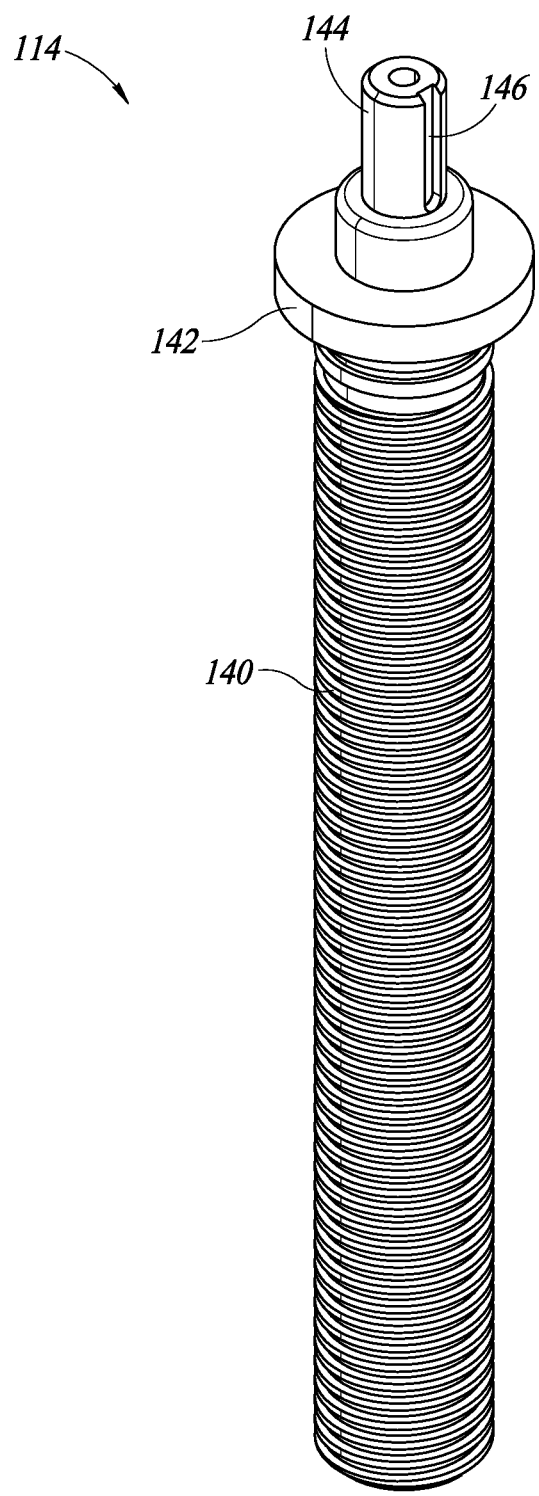
FIG. 14 illustrates a perspective view of a threaded rod of the valve gate of FIGS. 5 and 9.

FIG. 13 illustrates a front view of the valve gate 104 with the upstream portion of the housing 122, the downstream portion of the housing 124, the upstream seal 126, and the downstream seal 128 removed such that other features of the valve gate 104, such as of the threaded rod 114, the nut 116, the movable body 118, the first seal 120, and the pair of levers 130 are shown. FIG. 14 illustrates the threaded rod 114 by itself such that additional features thereof are revealed. As illustrated in FIG. 14, the threaded rod 114 includes a cylindrical and threaded main body 140 that extends along the central longitudinal axis of the threaded rod 114, a flange 142 that extends radially outward from the central longitudinal axis of the threaded rod 114, and a terminal end portion 144 that includes a groove or keyway 146 that is cut radially inward into the terminal end portion 144 and extends longitudinally along the length of the terminal end portion 144 in a direction aligned with or parallel to the central longitudinal axis of the threaded rod 114.

As illustrated in FIG. 1, the threaded rod 114 can be positioned within the tapping sleeve 102 such that the flange 142 is inside the tapping sleeve 102. In various embodiments, the flange 142 is retained such that it cannot travel along the central longitudinal axis of the threaded rod 114, but such that it can rotate about the central longitudinal axis of the threaded rod 114, and therefore such that the entire threaded rod 114 cannot travel along its own central longitudinal axis but can rotate about its own central longitudinal axis. As further illustrated in FIG. 1, the threaded rod 114 can be positioned within the tapping sleeve 102 such that its terminal end portion 144 and the keyway 146 thereof extend outside of the tapping sleeve 102. Thus, by engaging other device(s) with the terminal end portion 144 of the threaded rod 114, including with the keyway 146 thereof, an operator can actuate the threaded rod 114, such as to rotate about its own central longitudinal axis. While the threaded rod 114 described and illustrated herein includes the keyway 146 for engaging other devices with the terminal end portion 144 of the threaded rod 114, in other implementations, the threaded rod 114 may include other features, such as a spline or a square taper, for engaging other devices with the terminal end portion 144 of the threaded rod 114.

Figure 15:
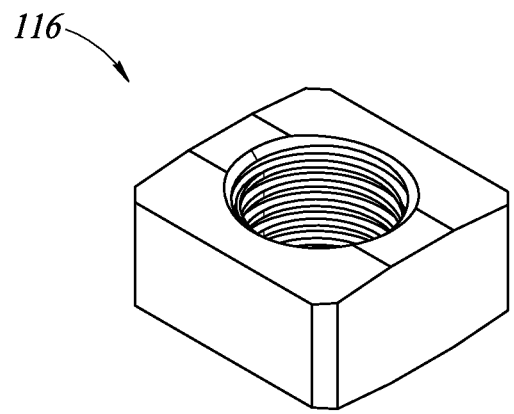
FIG. 15 illustrates a perspective view of a threaded square nut of the valve gate of FIGS. 5 and 9.

FIG. 15 illustrates the threaded square nut 116 by itself such that additional features thereof are revealed. The threaded square nut can have an internal bore that is threaded with threads complementary to and configured to engage with the threads of the threaded rod 114, and an outer surface that is generally square when the valve gate 104 is assembled and viewed along the central longitudinal axis of the threaded rod 114. In use, the nut 116 can be threaded onto the threads of the main body of the threaded rod 114 and positioned within the tapping sleeve 102 with the square outer surface thereof retained such that it can travel along the central longitudinal axis of the threaded rod 114, but such that it cannot rotate about the central longitudinal axis of the threaded rod 114. Thus, when the threaded rod 114 is actuated to rotate about its own central longitudinal axis, the engagement of the threads between the threaded rod 114 and the nut 116 and the retention of the nut 116 against rotation about the central longitudinal axis of the threaded rod 114 result in travel of the nut 116 along the central longitudinal axis of the threaded rod 114, with rotation of the rod 114 in a first direction causing travel of the nut 116 in a first direction and rotation of the rod 114 in a second direction opposite the first resulting in travel of the nut 116 in a second direction opposite the first.

Figure 16:
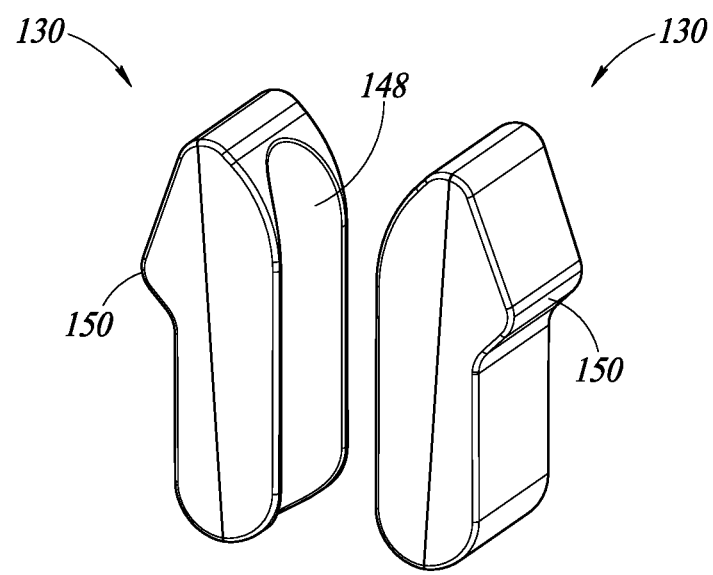
FIG. 16 illustrates a perspective view of a pair of levers of the valve gate of FIGS. 5 and 9.

FIG. 16 illustrates the pair of levers 130 by themselves such that additional features thereof are revealed. As illustrated in FIG. 16, the two levers 130, which are identical to one another and positioned to form mirror images of one another, each include a shaft having a groove 148 extending into and along a first side thereof and a protrusion or ridge 150 extending out of a second side thereof opposite to the first side thereof. Furthermore, each of the levers 130 has a first curved surface at a first end of its shaft that curves from the first side thereof including the groove 148 to the second side thereof including the protrusion or ridge 150. As further illustrated in FIG. 16, when the valve gate 104 is assembled, the pair of levers 130 are arranged such that they are generally aligned with one another, such that the first sides thereof and the grooves formed therein face toward one another, and such that the second sides thereof and the protrusions formed therein face away from one another. Respective end portions of the levers 130 can be spaced apart from one another by a distance corresponding to or matching a distance between the sockets 134a and 134b and a distance between the sockets 138a and 138b, such that the end portions of the levers 130 can be seated within the sockets 134a, 134b, 138a, and 138b when the valve gate 104 is assembled. Furthermore, the grooves 148 formed in the inner surfaces of the levers 130 can have curvatures configured to accommodate, corresponding to, or matching, the curvature or diameter of the threaded rod 114, such that when the valve gate 104 is assembled, the threaded rod 114 can extend between the levers 130 and be positioned at least partially within the grooves 148 such that the levers 130 fit at least partially around the curvature of the threaded rod 114.

Figure 17:
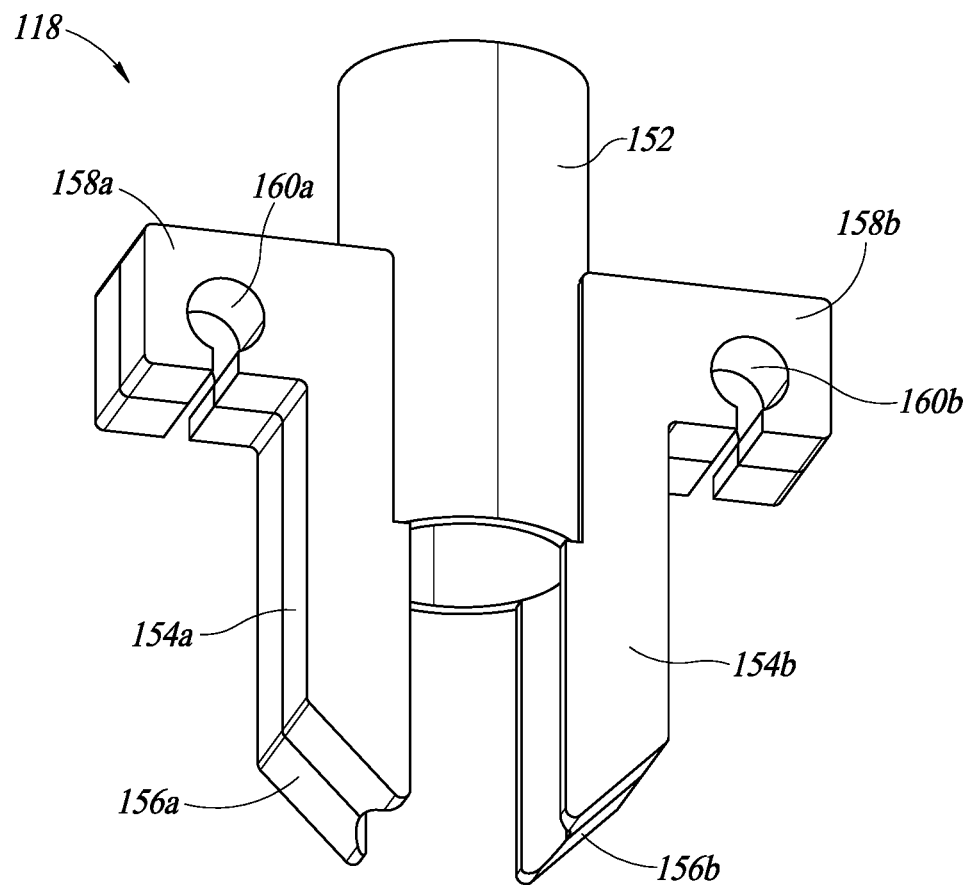
FIG. 17 illustrates a perspective view of a movable body of the valve gate of FIGS. 5 and 9.

FIG. 17 illustrates the movable body 118 by itself such that additional features thereof are revealed. As illustrated in FIG. 17, the movable body 118 includes a hollow cylindrical body or spacer 152 that has a central longitudinal axis coincident with the central longitudinal axis of the threaded rod 114, and that is configured to extend around the threaded rod 114 such that the threaded rod 114 can extend through the spacer 152 without contacting the spacer 152. The movable body 118 also includes a first leg 154a that extends longitudinally away from a terminal end portion of the spacer 152 at a first side of the spacer 152 in a direction aligned with or parallel to the central longitudinal axis of the threaded rod 114, and a second leg 154b that extends longitudinally away from the terminal end portion of the spacer 152 at a second side of the spacer 152 opposite to the first side thereof in a direction aligned with or parallel to the central longitudinal axis of the threaded rod 114. As illustrated in FIG. 17, the first leg 154a and the second leg 154b each include a groove extending into and along a length of an inner side surface thereof, such that the grooves of the first and second legs 154a, 154b face each other. These grooves can have curvatures configured to accommodate, corresponding to, or matching, the curvature or diameter of the threaded rod 114, such that when the valve gate 104 is assembled, the threaded rod 114 can extend between the first and second legs 154a, 154b, and be positioned at least partially within the grooves such that the legs 154a, 154b fit at least partially around the curvature of the threaded rod 114.

As illustrated in FIG. 17, the first and second legs 154a, 154b each have square or rectangular cross-sectional shapes when viewed along the central longitudinal axis of the threaded rod 114. As further illustrated in FIG. 17, a terminal end portion of the first leg 154a distal from the spacer 152 includes a wedge 156a, such that the cross-sectional shape of the first leg 154a decreases along the length of the wedge 156a to a tip or terminal distal end of the first leg 154a. In particular, the inner side surface of the first leg 154a that includes the groove described above extends linearly longitudinally away from the terminal end portion of the spacer 152 to the terminal distal end of the first leg 154*a* and an outer side surface of the first leg 154*a* opposite to the inner side surface thereof and to the groove formed therein extends linearly longitudinally away from the terminal end portion of the spacer 152 to the wedge 156*a*, and then both away from the terminal end portion of the spacer 152 and toward the inner side surface throughout the length of the wedge 156*a* until the outer side surface meets the inner side surface at the terminal distal end of the first leg 154*a*. Thus, the wedge 156*a* has a variable rectangular cross-sectional shape that tapers toward an edge at the terminal distal end of the first leg 154*a*, where the edge extends generally front-to-back when the valve gate 104 is assembled and viewed along the central longitudinal axis of the pipeline 100.

Similarly, a terminal end portion of the second leg 154*b* distal from the spacer 152 includes a wedge 156*b*, such that the cross-sectional shape of the second leg 154*b* decreases along the length of the wedge 156*b* to a tip or terminal distal end of the second leg 154*b*. In particular, the inner side surface of the second leg 154*b* that includes the groove described above extends linearly longitudinally away from the terminal end portion of the spacer 152 to the terminal distal end of the second leg 154*b* and an outer side surface of the second leg 154*b* opposite to the inner side surface thereof and to the groove formed therein extends linearly longitudinally away from the terminal end portion of the spacer 152 to the wedge 156*b*, and then both away from the terminal end portion of the spacer 152 and toward the inner side surface throughout the length of the wedge 156*b* until the outer side surface meets the inner side surface at the terminal distal end of the second leg 154*b*. Thus, the wedge 156*b* has a variable rectangular cross-sectional shape that tapers toward an edge at the terminal distal end of the second leg 154*b*, where the edge extends generally front-to-back when the valve gate 104 is assembled and viewed along the central longitudinal axis of the pipeline 100. Thus, when taken together with the rest of the movable body 118, the wedges 156*a* and 156*b* form a terminal end portion of the movable body 118 and taper toward one another at the terminal end portion of the movable body 118.

The movable body 118 also includes a first arm 158*a* that extends radially outward away from the first side of the spacer 152, from which the first leg 154*a* extends, in a direction transverse or perpendicular to the central longitudinal axis of the threaded rod 114 and transverse or perpendicular to the first leg 154*a*, and a second arm 158*b* that extends radially outward away from the second side of the spacer 152, from which the second leg 154*b* extends, in a direction transverse or perpendicular to the central longitudinal axis of the threaded rod 114 and transverse or perpendicular to the second leg 154*b*. As illustrated in FIG. 17, the first and second arms 158*a*, 158*b* each have square or rectangular cross-sectional shapes when viewed along their own respective central longitudinal axes, which may be radial, transverse, and/or perpendicular to the central longitudinal axis of the threaded rod 114.

As further illustrated in FIG. 17, the first arm 158*a* includes an undercut groove 160*a* formed in a side surface of the first arm 158*a* that faces toward the wedge 156*a* at the terminal end portion of the first leg 154*a*, and that extends front-to-back along a length of the first arm 158*a* when the valve gate 104 is assembled and viewed along the central longitudinal axis of the pipeline 100. Similarly, the second arm 158*b* includes an undercut groove 160*b* formed in a side surface of the second arm 158*b* that faces toward the wedge 156*b* at the terminal end portion of the second leg 154*b*, and that extends front-to-back along a length of the second arm 158*b* when the valve gate 104 is assembled and viewed along the central longitudinal axis of the pipeline 100. When the valve gate 104 is assembled, portions of the first seal 120 can be seated within the first and second undercut grooves 160*a*, 160*b* to couple the first seal 120 to the movable body 118, as described further elsewhere herein.

Figure 18:
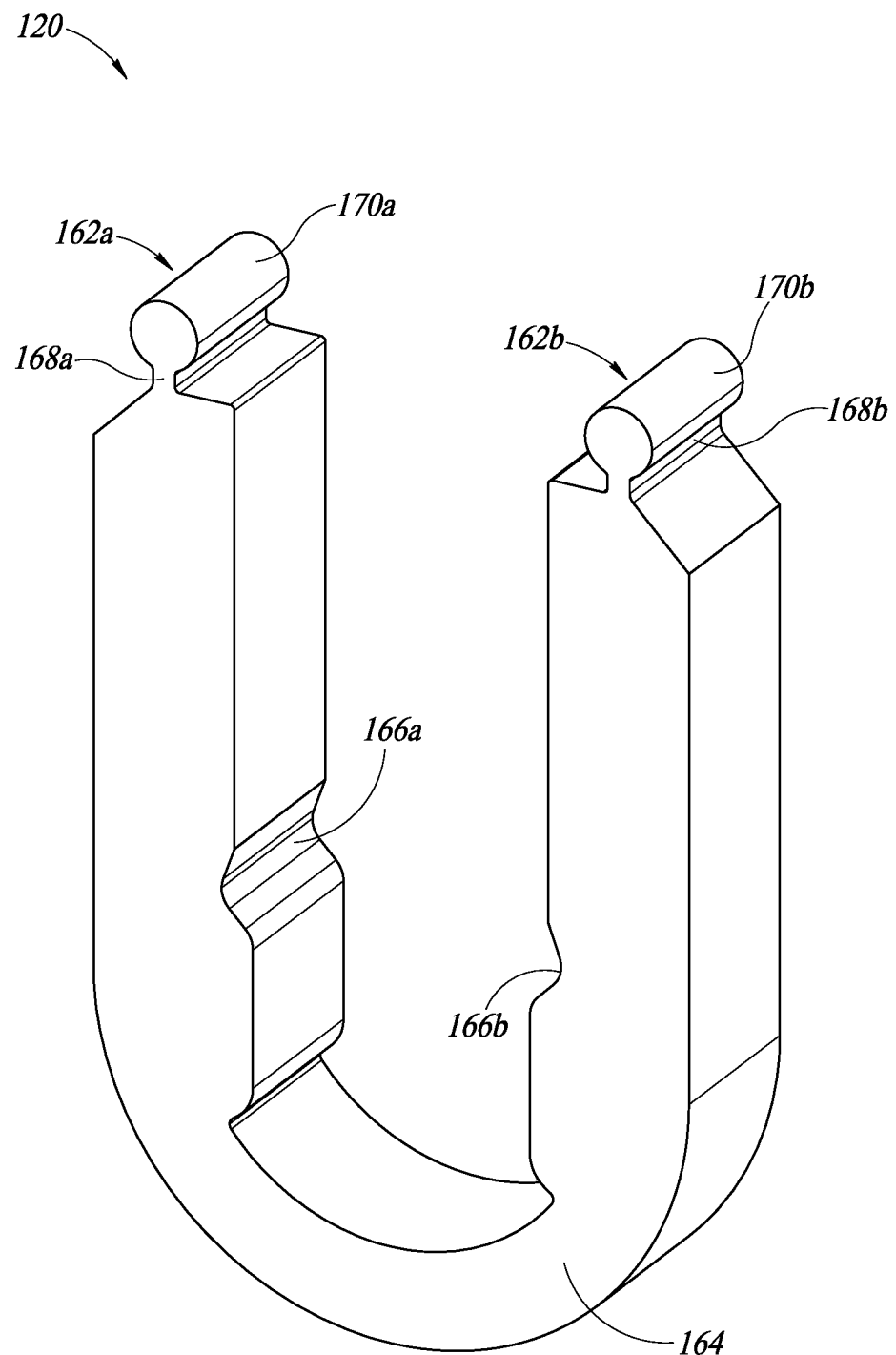
FIG. 18 illustrates a perspective view of a seal of the valve gate of FIGS. 5 and 9.

FIG. 18 illustrates the first seal 120 by itself such that additional features thereof are revealed. As illustrated in FIG. 18, the first seal 120 is generally U-shaped, and includes a first end portion 162*a*, which forms a first terminal end of its overall U-shape, and a second end portion 162*b*, which forms a second terminal end of its overall U-shape. The first seal 120 also includes an intermediate portion or main body 164 that extends longitudinally away from the first end portion 162*a*, curves to form a semi-circular curved intermediate or central portion thereof, and then extends longitudinally toward the second end portion 162*b*. When the valve gate 104 is assembled, the longitudinally extending portions of the main body 164 may be aligned with or extend parallel or substantially parallel to each other and to the central longitudinal axis of the threaded rod 114.

As also illustrated in FIG. 18, the first seal 120 has a generally rectangular cross-sectional profile along a length of its overall U-shape, and the dimensions of the cross-sectional profile of the first seal 120 are variable along its length. For example, dimensions of the cross-sectional profile of the main body 164 of the first seal 120 decrease or taper toward each of the first end portion 162*a* and the second end portion 162*b* of the first seal 120, partially forming respective neck portions thereof. As another example, the first seal 120 includes a first indentation 166*a* formed in an inner surface of a first longitudinally-extending portion thereof (i.e., a surface that faces inward with respect to the overall U-shape or toward a second longitudinally-extending portion thereof) and a second indentation 166*b* formed in an inner surface of the second longitudinally-extending portion thereof (i.e., a surface that faces inward with respect to the overall U-shape or toward the first longitudinally-extending portion thereof). Dimensions of the cross-sectional profile of the main body 164 of the first seal 120 decrease or taper at each of the first and second indentations 166*a*, 166*b*, such as by amounts corresponding to dimensions of the protrusions or ridges 150 of the levers 130, such that the ridges 150 of the levers 130 can be snugly seated within the indentations 166*a*, 166*b* when the valve gate 104 is assembled.

As further illustrated in FIG. 18, the first end portion 162*a* includes a neck 168*a* coupled to the adjacent tapered portion of the main body 164 and a head, or a rail or shaft 170*a* that extends front-to-back when the valve gate 104 is assembled and viewed along the central longitudinal axis of the pipeline 100. Thus, the neck 168*a* couples the shaft 170*a* to the tapered portion of the main body 164. Similarly, the second end portion 162*b* includes a neck 168*b* coupled to the adjacent tapered portion of the main body 164 and a head, or a rail or shaft 170*b* that extends front-to-back when the valve gate 104 is assembled and viewed along the central longitudinal axis of the pipeline 100. Thus, the neck 168*b* couples the shaft 170*b* to the tapered portion of the main body 164. The shafts 170*a*, 170*b* have dimensions corresponding to or matching dimensions of the undercut grooves 160*a*, 160*b*, such that the shafts 170*a*, 170*b* can be seated within the undercut grooves 160*a*, 160*b* to securely couple the first seal 120 to the movable body 118.

FIGS. 7, 11, and 13 illustrate additional details regarding the ways in which the various components of the valve gate 104 engage and interact with one another. As illustrated in FIGS. 7, 11, and 13, when the valve gate 104 is assembled, the nut 116 is threaded onto the threaded rod 114 and positioned proximate the flange 142 of the threaded rod 114. The movable body 118 is mounted on the threaded rod 114 such that the threaded rod 114 extends through the spacer 152 and between the first and second legs 154a, 154b such that the threaded rod 114 is positioned at least partially within the grooves formed in the inner surfaces of the first and second legs 154a, 154b, such that the nut 116 is located between the movable body 118 and the flange 142 of the threaded rod 114 and abuts directly against a terminal end portion of the movable body 118 opposite to the wedges 156a, 156b thereof, and such that the movable body 118 can move freely along the length of the threaded rod 114 and the central longitudinal axis thereof.

As further illustrated in FIGS. 7, 11, and 13, when the valve gate 104 is assembled, the shafts 170a, 170b of the first and second end portions 162a, 162b of the first seal 120 are seated within the undercut grooves 160a, 160b of the first and second arms 158a, 158b such that the first end portion 162a of the first seal 120 is securely coupled to the first arm 158a, the second end portion 162b of the first seal 120 is securely coupled to the second arm 158b, and the main body 164 of the first seal 120 extends around a terminal distal end portion of the threaded rod 114 and wraps around a distal end of the valve gate 104.

As further illustrated in FIGS. 7, 11, and 13, the upstream portion of the housing 122 and the downstream portion of the housing 124 are positioned such that a majority of the threaded rod 114, a majority of the movable body 118, an inner portion of the first seal 120, and the pair of levers 130 are located or sandwiched between the upstream portion of the housing 122 and the downstream portion of the housing 124. When the upstream portion of the housing 122 and the downstream portion of the housing 124 are positioned in this manner, the protrusions 132 and 136 are positioned adjacent to and/or spaced apart from one another within an open space or pocket formed between the terminal distal end of the threaded rod 114 and an inner surface of the main body 164 at a central portion of the main body 164. The upstream portion of the housing 122 and the downstream portion of the housing 124 are coupled to one another in this configuration but not rigidly coupled to at least some of the other components of the valve gate 104 described herein, such that, for example, the threaded rod 114 can rotate freely, the nut 116 can translate freely, the movable body 118 can translate freely, the seal 120 can move freely, and the levers 130 can rotate freely, with respect to the upstream portion of the housing 122 and the downstream portion of the housing 124.

As further illustrated in FIGS. 7, 11, and 13, when the valve gate 104 is assembled, the levers 130 are positioned as described elsewhere herein, that is, generally aligned with one another such that the grooves 148 face toward one another and such that the threaded rod 114 extends between the levers 130 and is positioned at least partially within the grooves 148. When so assembled, the levers are each located between the threaded rod 114 and a respective portion of the first seal 120, as well as between the wedges 156a, 156b of the movable body and the protrusions 132, 136 of the upstream portion of the housing 122 and the downstream portion of the housing 124. Furthermore, when so assembled, a first curved end of a first one of the levers 130 is positioned within both the first socket 134a formed in the protrusion 132 of the downstream portion of the housing 124 and the second socket 138b formed in the protrusion 136 of the upstream portion of the housing 122. Thus, the first one of the levers 130 can rotate, such as either frictionally or without friction by rolling against the curved surfaces of the first socket 134a and the second socket 138b, about an axis aligned with a central longitudinal axis of the pipeline 100 with respect to the other components of the assembled valve gate 104.

Furthermore, when the valve gate 104 is assembled, a second curved end of the first one of the levers 130 opposite to the first curved end thereof and the sockets 134a and 138b is engaged with and abuts against the outer side surface of the wedge 156a such that the wedge 156a extends between the second curved end of the first one of the levers 130 and the threaded rod 114. Additionally, the first one of the levers 130 is positioned such that an outer surface thereof is directly engaged with and abuts against an inner side surface of the main body 164 of the first seal 120, for example, such that the protrusion 150 of the first one of the levers 130 is seated snugly within the first indentation 166a of the main body 164 of the first seal 120.

Similarly, when so assembled, a first curved end of a second one of the levers 130 is positioned within both the second socket 134b formed in the protrusion 132 of the downstream portion of the housing 124 and the first socket 138a formed in the protrusion 136 of the upstream portion of the housing 122. Thus, the second one of the levers 130 can rotate, such as either frictionally or without friction by rolling against the curved surfaces of the second socket 134b and the first socket 138a, about an axis aligned with a central longitudinal axis of the pipeline 100 with respect to the other components of the assembled valve gate 104.

Furthermore, when the valve gate 104 is assembled, a second curved end of the second one of the levers 130 opposite to the first curved end thereof and the sockets 134b and 138a is engaged with and abuts against the outer side surface of the wedge 156b such that the wedge 156b extends between the second curved end of the second one of the levers 130 and the threaded rod 114. Additionally, the second one of the levers 130 is positioned such that an outer surface thereof is directly engaged with and abuts against an inner side surface of the main body 164 of the first seal, for example, such that the protrusion 150 of the second one of the levers 130 is seated snugly within the second indentation 166b of the main body 164 of the first seal 120.

To actuate and operate the valve gate 104, such as to move the valve gate 104 into the pipeline 100 through the opening 110 and thereby begin to seal the pipeline 100, as described elsewhere herein, an operator can actuate the threaded rod 114 to rotate about its own central longitudinal axis by engaging other device(s) with the terminal end portion 144 of the threaded rod 114, including with the keyway 146 thereof. Actuating the threaded rod 114 to rotate about its own central longitudinal axis, as also described elsewhere herein, causes the nut 116 to travel along the length of the threaded rod 114 and its central longitudinal axis. Because the nut 116 abuts against a terminal end portion of the movable body 118 and the movable body 118 is free to move along the length of the threaded rod 114, causing the nut 116 to travel along the length of the threaded rod 114 also causes the movable body 118 to travel along the length of the threaded rod 114 and its central longitudinal axis.

While the valve gate 104 is being moved into the pipeline 100 through the opening 110, and before a distal end of the valve gate 104 comes into contact with a surface of the pipeline 100 opposite to the opening 110, causing movement of the movable body 118 along the length of the threaded rod 114 also causes the rest of the valve gate 104, including the first seal 120, the levers 130, the upstream portion of the housing 122, and the downstream portion of the housing 124, to move along the length of the threaded rod 114 into the pipeline 100. Once the valve gate 104 has been moved into the pipeline 100 through the opening 110 and the distal end of the valve gate 104 comes into contact with the surface of the pipeline 100 opposite the opening 110, however, further distal movement of a central portion of the main body 164 of the first seal 120 (i.e., a distal portion thereof), the upstream portion of the housing 122, and the downstream portion of the housing 124 is blocked or prevented by the engagement of the valve gate 104 with the surface of the pipeline 100 opposite the opening 110.

Thus, at this stage, continued movement of the movable body 118 along the length of the threaded rod 114 causes continued movement of the first and second end portions 162a, 162b of the first seal, but not of the entirety of the main body 164 of the first seal 120. Continued movement of the movable body 118 along the length of the threaded rod 114 also causes the outer surfaces of the wedges 156a, 156b to exert forces against the second curved ends of the levers 130, which, when combined with the engagement of the first curved ends of the levers 130 with the sockets 134a, 134b, 138a, and 138b, causes the levers 130 to pivot or rotate outward with respect to one another and with respect to the threaded rod 114 about their first curved ends engaged with the sockets 134a, 134b, 138a, and 138b. Such rotation may be without friction, in the sense that the curved surfaces of the levers 130 roll along, rather than slide along or rotate against, the curved surfaces of the sockets 134a, 134b, 138a, and 138b.

Such outward rotation of the levers 130, combined with the engagement of the outer surfaces of the levers 130 with the inner surface of the first seal 120, causes the portions of the first seal 120 engaged with the levers 130 to move outward, thereby causing the overall profile of the valve gate 104 when viewed along the central longitudinal axis of the pipeline 100 to expand, such as to a profile that is larger than the opening 110 in the pipeline 100. In particular, because the outer surfaces of the wedges 156a, 156b exert forces against the levers 130 at locations farther from the sockets 134a, 134b, 138a, and 138b than the locations at which the levers 130 engage with the inner surface of the first seal 120, the forces applied by the levers 130 to the first seal 120 are larger than the forces applied by the wedges 156a, 156b to the levers 130 and the travel of the portions of the first seal 120 engaged with the levers 130 is smaller than the travel of the ends of the levers 130 engaged with the wedges 156a, 156b. In some embodiments, the continued movement of the first and second end portions 162a, 162b of the first seal, but not of the entirety of the main body 164 of the first seal 120 allows for some slack to develop in the seal 120 between the first and second end portions 162a, 162b and the distal, central portion of the main body 164, which slack can be taken up, such as entirely taken up, by the expansion of the main body 164 outwards with respect to the threaded rod 114.

While the first seal 120 is expanding radially outward with respect to the central longitudinal axis of the pipeline 100, and before the first seal 120 fully engages with the inner surface of the pipeline 100 to form a complete seal therewith, continued movement of the movable body 118 along the length of the threaded rod 114 causes continued outward rotation of the levers 130 and continued expansion of the main body 164 of the first seal 120 radially outwards with respect to the central longitudinal axis of the pipeline 100. Once the main body 164 of the first seal 120 fully engages with the inner surface of the pipeline 100 and forms a complete seal therewith, however, further expansion of the first seal 120 is blocked or prevented by the engagement of the first seal 120 with the inner surface of the pipeline 100. At this stage, rotation of the threaded rod 114 can be ceased and the actuation of the valve gate 104 to seal the pipeline 100 is complete. In this configuration, the valve gate 104 is in an engaged, inserted, closed, and sealed position or configuration.

To actuate and operate the valve gate 104, such as to retract the valve gate 104 by moving the valve gate 104 out of the pipeline 100 through the opening 110, as described elsewhere herein, an operator can actuate the threaded rod 114 to rotate about its own central longitudinal axis by engaging other device(s) with the terminal end portion 144 of the threaded rod 114, including with the keyway 146 thereof, such that the threaded rod 114 rotates in a direction opposite to that used to insert the valve gate 104. Such rotation of the threaded rod 114 acts to move the components of the valve gate 104 in directions opposite to those described above for the insertion of the valve gate 104. For example, in a first step, the first seal 120 is retracted into the rest of the valve gate 104 and the overall profile of the valve gate 104 as viewed along the central longitudinal axis of the pipeline 100 decreases, such as to a profile that is smaller than the opening 110 in the pipeline 100. As another example, in a second step, the valve gate 104 may be retracted from the pipeline 100 through the opening 110 therein. Such actions can be used to move the valve gate 104 to a disengaged, retracted, withdrawn, open, and unsealed position or configuration. Inserting and retracting the valve gate 104 to seal and unseal the pipeline 100 can be repeated as desired.

Figure 19:
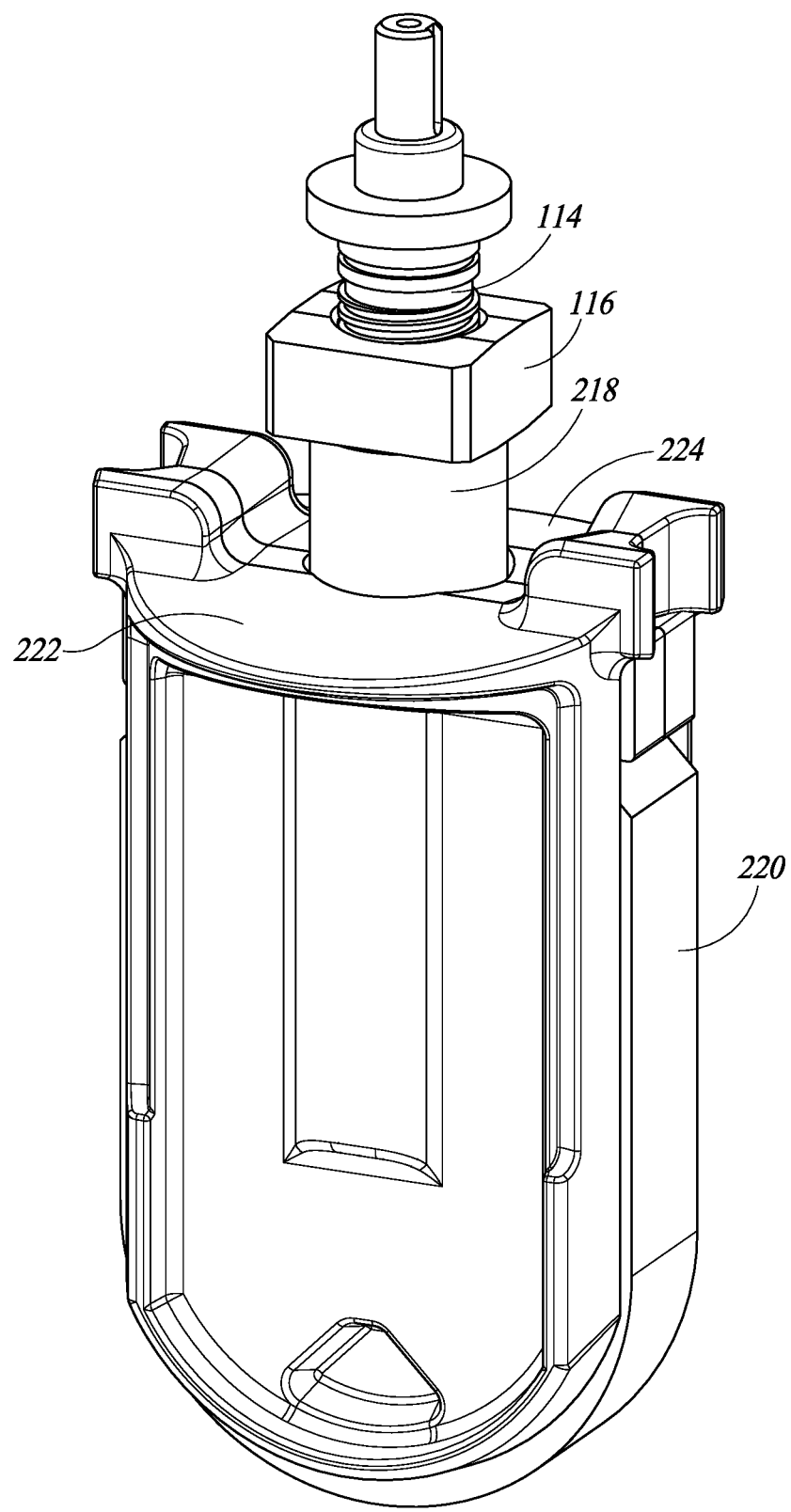
FIG. 19 illustrates a perspective view of another valve gate.
Figure 20:
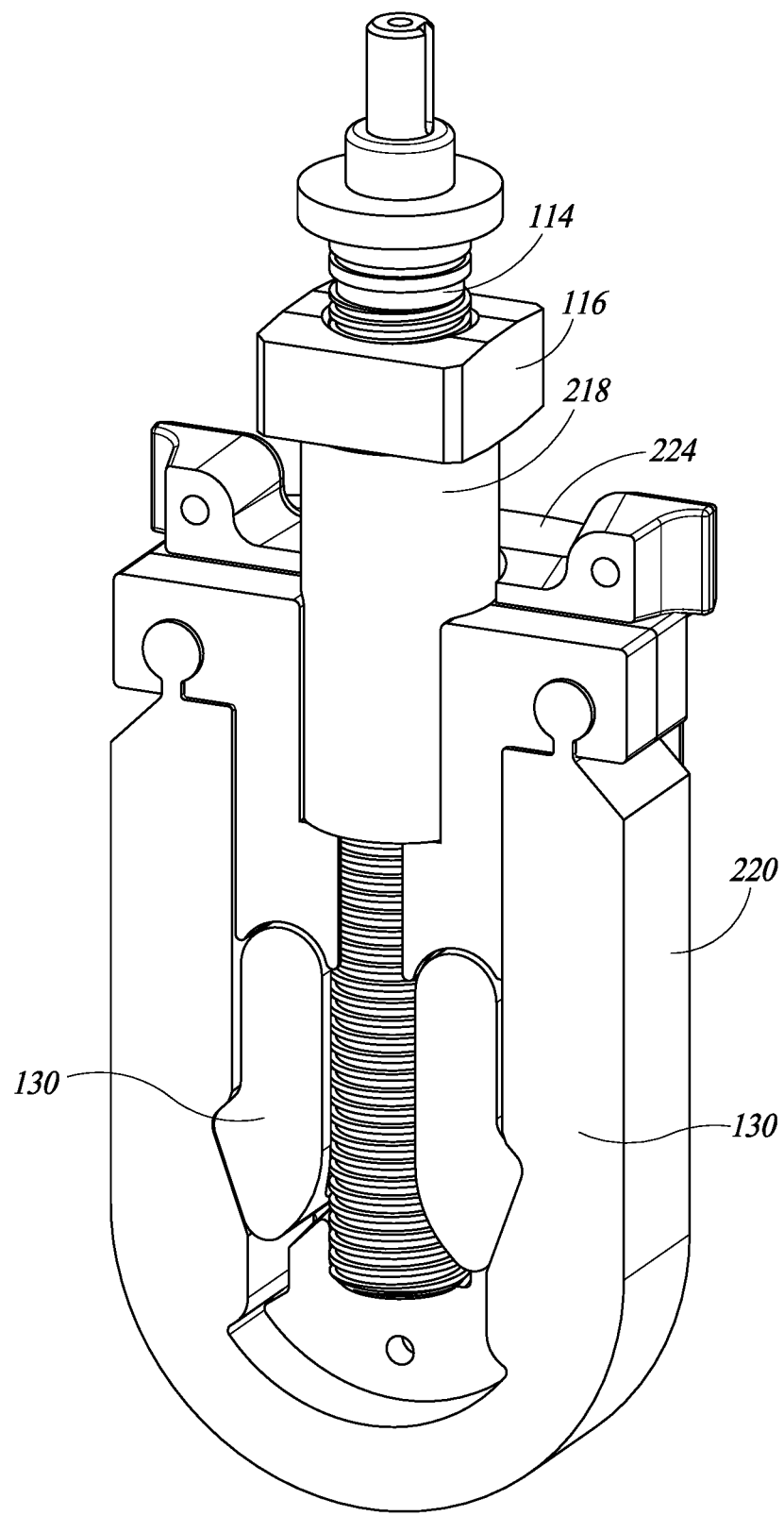
FIG. 20 illustrates a perspective view of the valve gate of FIG. 19 with seal components and a portion of a housing removed.
Figure 21:
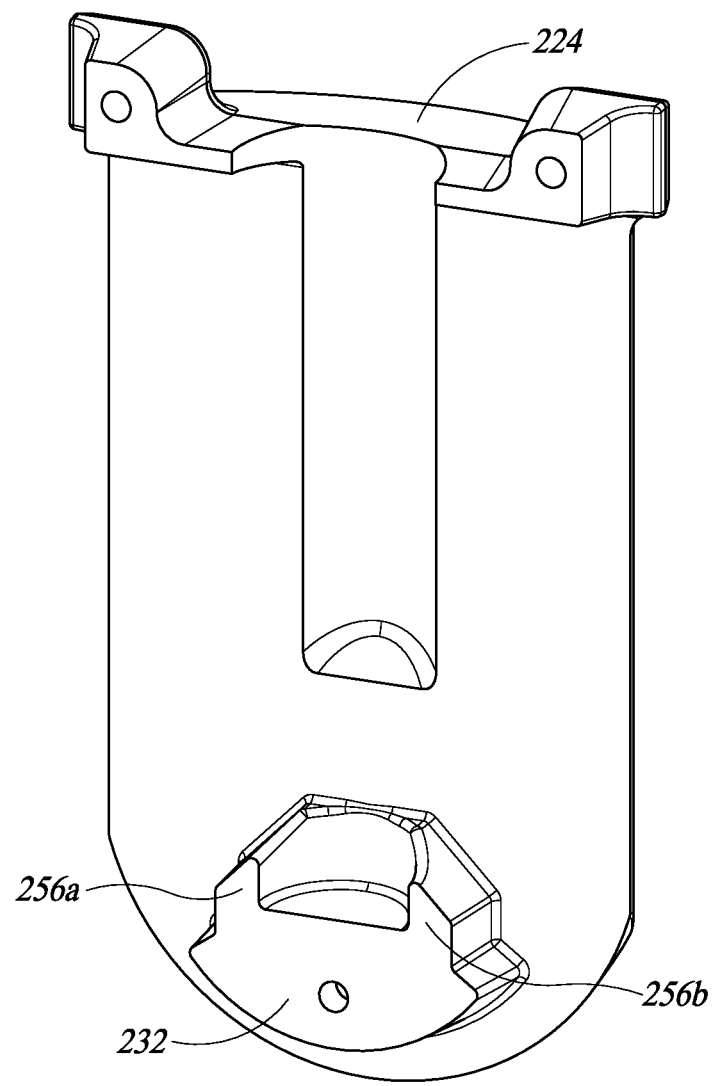
FIG. 21 illustrates a perspective view of a portion of a housing of the valve gate of FIG. 19.

FIGS. 19-27 illustrate additional features of alternative valve gate components that can be used with any of the components and features of the valve gate 104 described herein. FIGS. 19-27 illustrate such alternative valve gate components together with the threaded rod 114, the nut 116, and the pair of levers 130, which are oriented upside down in FIGS. 19-27 with respect to the other components of the valve gate as compared to their orientation with respect to the other components of the valve gate 104 in FIGS. 5-18. For example, FIGS. 19-21 illustrate various features of alternative valve gate components from a single consistent perspective view. For example, FIG. 19 illustrates the alternative components in an assembled state. As illustrated in FIG. 19, the alternative components include a spacer or load transfer or movable body 218, a seal 220, a first housing component or portion of a housing 222, which may be an upstream portion of a housing 222, and a second housing component or portion of a housing 224, which may be a downstream portion of a housing 224.

FIG. 20 illustrates the alternative components with the upstream portion of the housing 222 removed such that additional features of the alternative components, such as of the movable body 218 and the seal 220 are shown. FIG. 21 illustrates the downstream portion of the housing 224 by itself and shows that the downstream portion of the housing 224 includes a protrusion 232 that extends inwardly and in an upstream direction from an inner or upstream surface of the downstream portion of the housing 224.

As illustrated in FIG. 21, when a valve gate is located within the pipeline 100 and the downstream portion of the housing 224 and the protrusion 232 are viewed along the central longitudinal axis of the pipeline 100, the protrusion 232 includes a first wedge 256a, such that the cross-sectional shape of the first wedge 256a decreases along the length of the wedge 256a to a tip or terminal end of the first wedge 256a. In particular, an inner side surface of the first wedge 256a extends generally parallel to the central longitudinal axis of the threaded rod 114 and an outer side surface of the first wedge 256a opposite to the inner side surface thereof extends at an oblique angle toward the inner side surface throughout the length of the wedge 256a until the outer side surface meets the inner side surface at the terminal end of the first wedge 256a. Thus, the wedge 256a has a variable rectangular cross-sectional shape that tapers toward the nut 116 and toward an edge at the terminal end of the first wedge 256a, where the edge extends generally front-to-back when the valve gate is assembled and viewed along the central longitudinal axis of the pipeline 100.

As further illustrated in FIG. 21, when a valve gate is located within the pipeline 100 and the downstream portion of the housing 224 and the protrusion 232 are viewed along the central longitudinal axis of the pipeline 100, the protrusion 232 also includes a second wedge 256b, such that the cross-sectional shape of the second wedge 256b decreases along the length of the wedge 256b to a tip or terminal end of the second wedge 256b. In particular, an inner side surface of the second wedge 256b extends generally parallel to the central longitudinal axis of the threaded rod 114 and an outer side surface of the second wedge 256b opposite to the inner side surface thereof extends at an oblique angle toward the inner side surface throughout the length of the wedge 256b until the outer side surface meets the inner side surface at the terminal end of the second wedge 256b. Thus, the wedge 256b has a variable rectangular cross-sectional shape that tapers toward the nut 116 and toward an edge at the terminal end of the second wedge 256b, where the edge extends generally front-to-back when the valve gate is assembled and viewed along the central longitudinal axis of the pipeline 100. Thus, when taken together with the rest of the downstream portion of the housing 224, the wedges 256a and 256b taper toward one another.

Figure 22:
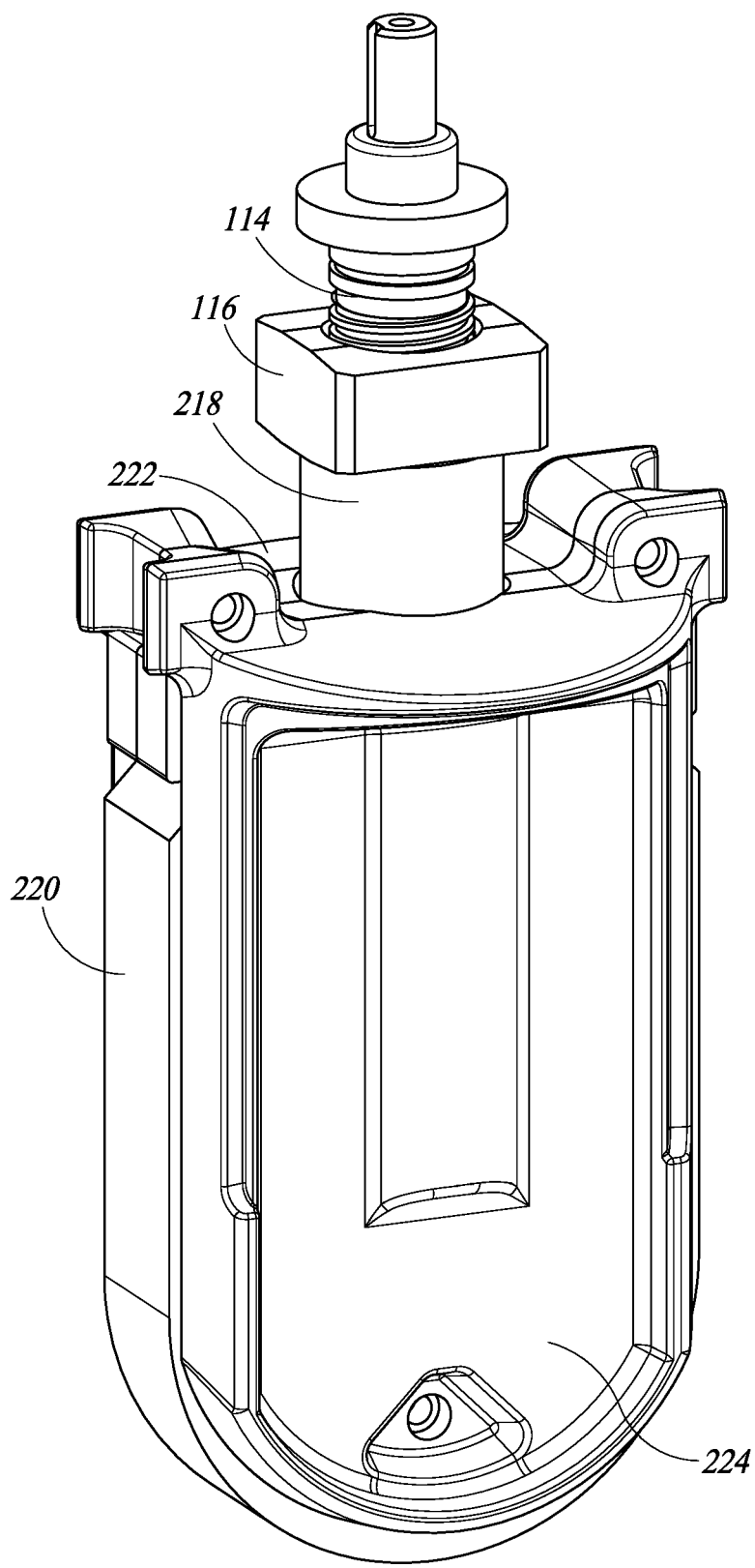
FIG. 22 illustrates another perspective view of the valve gate of FIG. 19.
Figure 23:
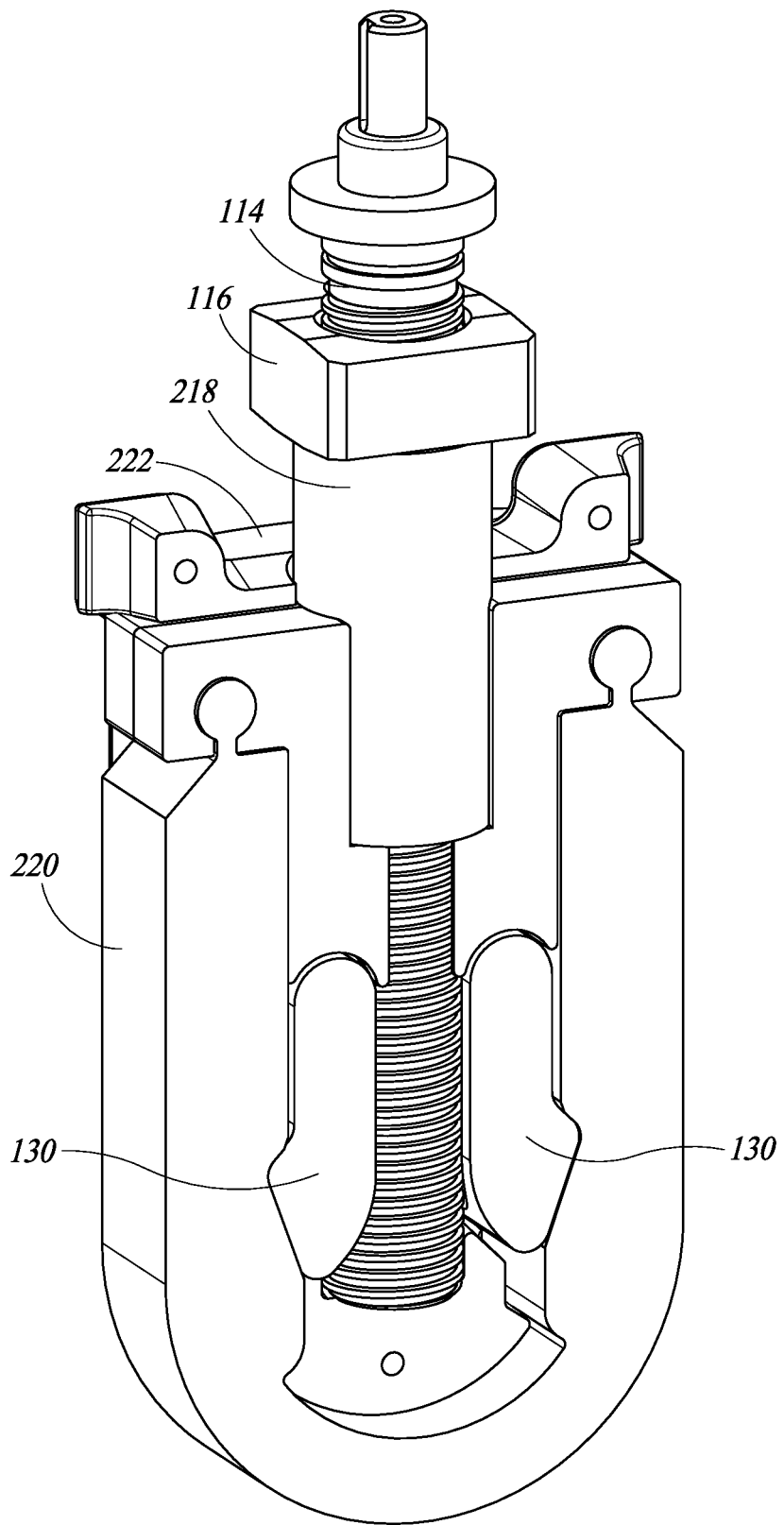
FIG. 23 illustrates another perspective view of the valve gate of FIGS. 19 and 22 with seal components and a portion of a housing removed.
Figure 24:
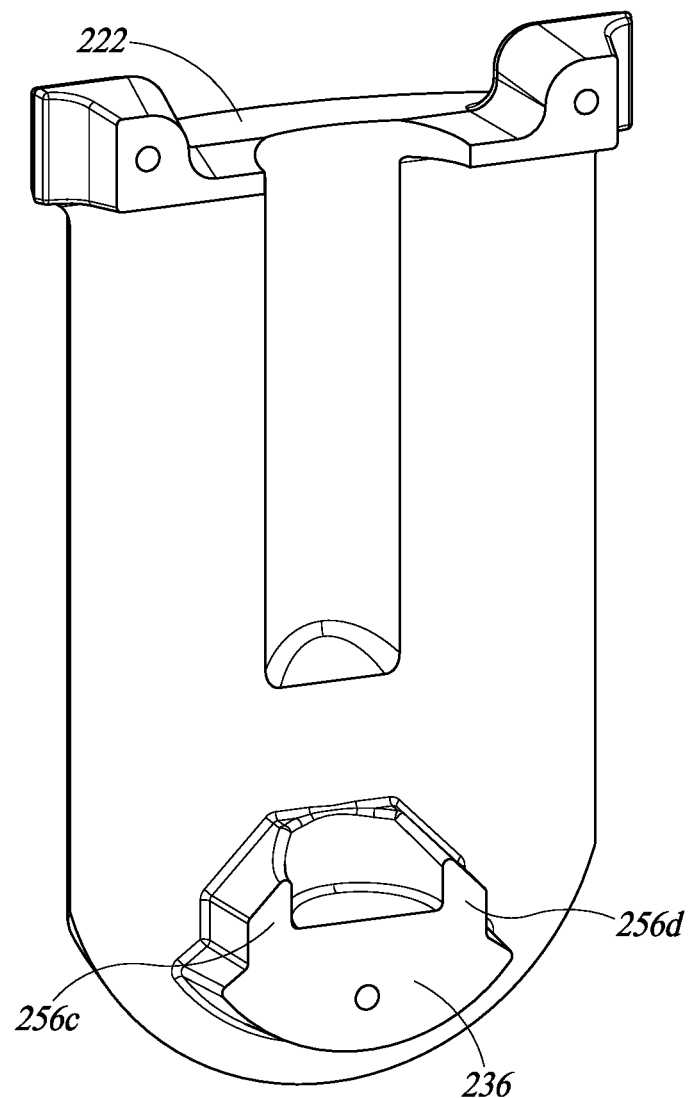
FIG. 24 illustrates a perspective view of a portion of a housing of the valve gate of FIGS. 19 and 22.

FIGS. 22-24 illustrate various features of the alternative components from a single consistent perspective, which is different than the perspective used in FIGS. 19-21. In particular, FIG. 22 illustrates the alternative components in an assembled state. FIG. 23 illustrates the alternative components with the downstream portion of the housing 224 removed such that additional features of the alternative components, such as of the movable body 218 and the seal 220 are shown. FIG. 24 illustrates the upstream portion of the housing 222 by itself and shows that the upstream portion of the housing 222 includes a protrusion 236 that extends inwardly and in a downstream direction from an inner or downstream surface of the upstream portion of the housing 222.

As illustrated in FIG. 24, when a valve gate is located within the pipeline 100 and the upstream portion of the housing 222 and the protrusion 236 are viewed along the central longitudinal axis of the pipeline 100, the protrusion 236 includes a third wedge 256c, such that the cross-sectional shape of the third wedge 256c decreases along the length of the wedge 256c to a tip or terminal end of the third wedge 256c. In particular, an inner side surface of the third wedge 256c extends generally parallel to the central longitudinal axis of the threaded rod 114 and an outer side surface of the third wedge 256c opposite to the inner side surface thereof extends at an oblique angle toward the inner side surface throughout the length of the wedge 256c until the outer side surface meets the inner side surface at the terminal end of the third wedge 256c. Thus, the wedge 256c has a variable rectangular cross-sectional shape that tapers toward the nut 116 and toward an edge at the terminal end of the third wedge 256c, where the edge extends generally front-to-back when the valve gate is assembled and viewed along the central longitudinal axis of the pipeline 100.

As further illustrated in FIG. 24, when a valve gate is located within the pipeline 100 and the upstream portion of the housing 222 and the protrusion 236 are viewed along the central longitudinal axis of the pipeline 100, the protrusion 236 also includes a fourth wedge 256d, such that the cross-sectional shape of the fourth wedge 256d decreases along the length of the wedge 256d to a tip or terminal end of the fourth wedge 256d. In particular, an inner side surface of the fourth wedge 256d extends generally parallel to the central longitudinal axis of the threaded rod 114 and an outer side surface of the fourth wedge 256d opposite to the inner side surface thereof extends at an oblique angle toward the inner side surface throughout the length of the wedge 256d until the outer side surface meets the inner side surface at the terminal end of the fourth wedge 256d. Thus, the wedge 256d has a variable rectangular cross-sectional shape that tapers toward the nut 116 and toward an edge at the terminal end of the fourth wedge 256d, where the edge extends generally front-to-back when the valve gate is assembled and viewed along the central longitudinal axis of the pipeline 100. Thus, when taken together with the rest of the upstream portion of the housing 222, the wedges 256c and 256d taper toward one another.

Figure 25:
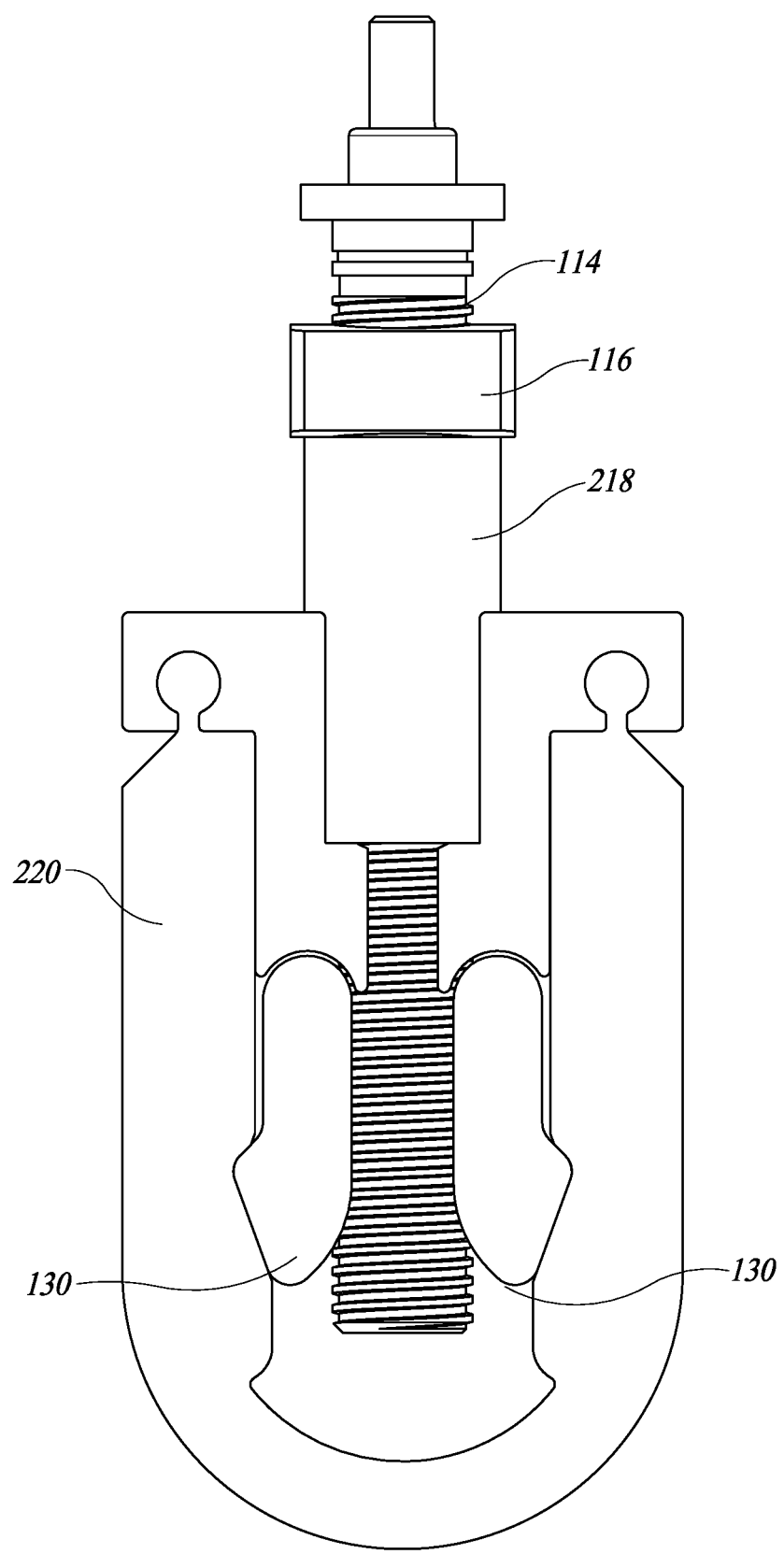
FIG. 25 illustrates a front view of the valve gate of FIGS. 19 and 22 with a seal and two portions of a housing removed.

FIG. 25 illustrates a front view of a valve gate with the upstream portion of the housing 222 and the downstream portion of the housing 224 removed such that other features of the valve gate, such as of the threaded rod 114, the nut 116, the movable body 218, the seal 220, and the pair of levers 130 are shown.

Figure 26:
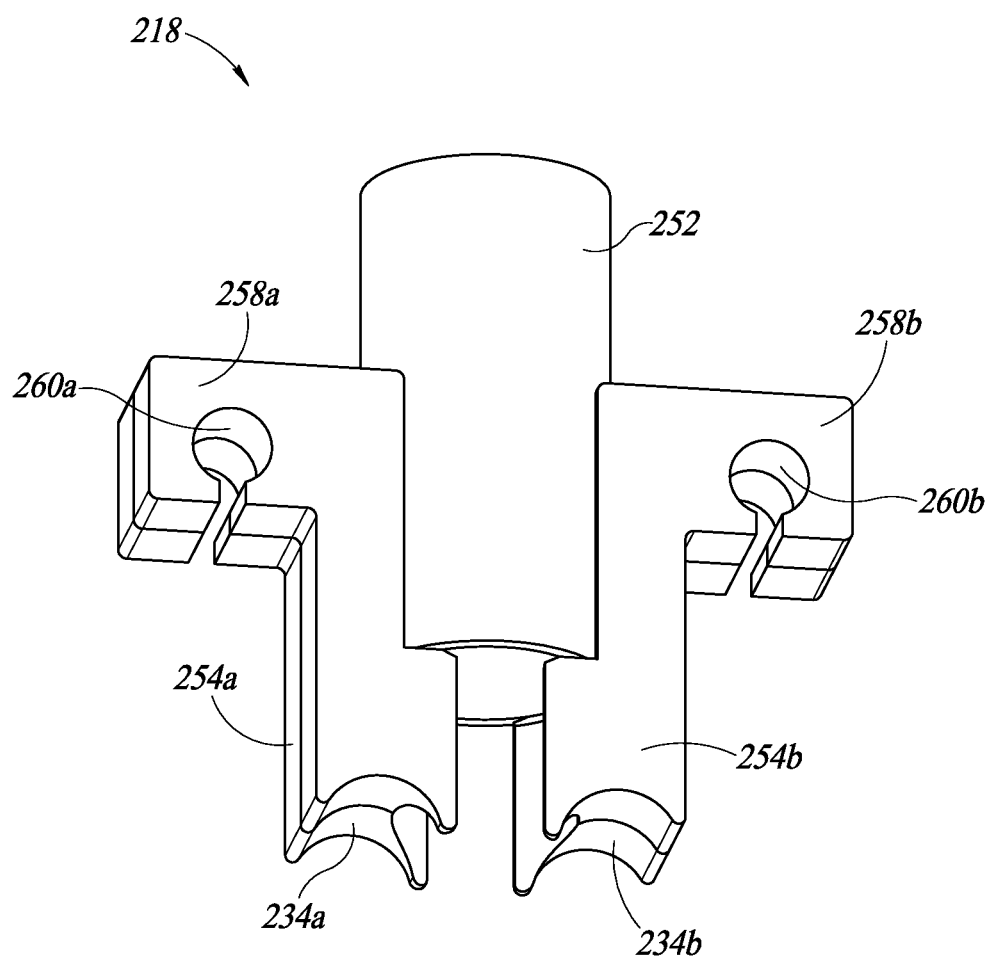
FIG. 26 illustrates a perspective view of a movable body of the valve gate of FIGS. 19 and 22.

FIG. 26 illustrates the movable body 218 by itself such that additional features thereof are revealed. As illustrated in FIG. 26, the movable body 218 includes a hollow cylindrical body or spacer 252 that has a central longitudinal axis coincident with the central longitudinal axis of the threaded rod 114, and that is configured to extend around the threaded rod 114 such that the threaded rod 114 can extend through the spacer 252 without contacting the spacer 252. The movable body 218 also includes a first leg 254a that extends longitudinally away from a terminal end portion of the spacer 252 at a first side of the spacer 252 in a direction aligned with or parallel to the central longitudinal axis of the threaded rod 114, and a second leg 254b that extends longitudinally away from the terminal end portion of the spacer 252 at a second side of the spacer 252 opposite to the first side thereof in a direction aligned with or parallel to the central longitudinal axis of the threaded rod 114. As illustrated in FIG. 26, the first leg 254a and the second leg 254b each include a groove extending into and along a length of an inner side surface thereof, such that the grooves of the first and second legs 254a, 254b face each other. These grooves can have curvatures configured to accommodate, corresponding to, or matching, the curvature or diameter of the threaded rod 114, such that when the valve gate is assembled, the threaded rod 114 can extend between the first and second legs 254a, 254b, and be positioned at least partially within the grooves such that the legs 254a, 254b fit at least partially around the curvature of the threaded rod 114.

As illustrated in FIG. 26, the first and second legs 254a, 254b each have square or rectangular cross-sectional shapes when viewed along the central longitudinal axis of the threaded rod 114. As further illustrated in FIG. 26, terminal end portions of the first and second legs 254a and 254b distal from the spacer 252 include respective sockets 234a, 234b, each of which includes a curved bearing surface. In particular, when viewed along the central longitudinal axis of the pipeline 100, the first socket 234a is spaced apart from the central longitudinal axis of the threaded rod 114 by a first distance in a first direction, and the second socket 234b is spaced apart from the central longitudinal axis of the threaded rod 114 by a second distance, which may be the same as the first distance, in a second direction, which may be opposite to the first direction. Each of the sockets 234a, 234b includes a bearing surface that extends linearly in a direction along a respective axis aligned with or parallel to the central longitudinal axis of the pipeline 100, and that is curved about such respective axes. Thus, each of the sockets 234a, 234b forms a respective channel or cup oriented to face downward away from the nut 116 when the valve gate is assembled. Each of the sockets 234a, 234b can form a respective fulcrum for a respective one of the levers 130 when the valve gate is assembled and in use, as described further elsewhere herein. In some embodiments, the levers 130 may be mounted in the sockets 234a, 234b on axles. Thus, when taken together with the rest of the movable body 218, the sockets 234a, 234b form a terminal end portion of the movable body 218.

Figure 27:
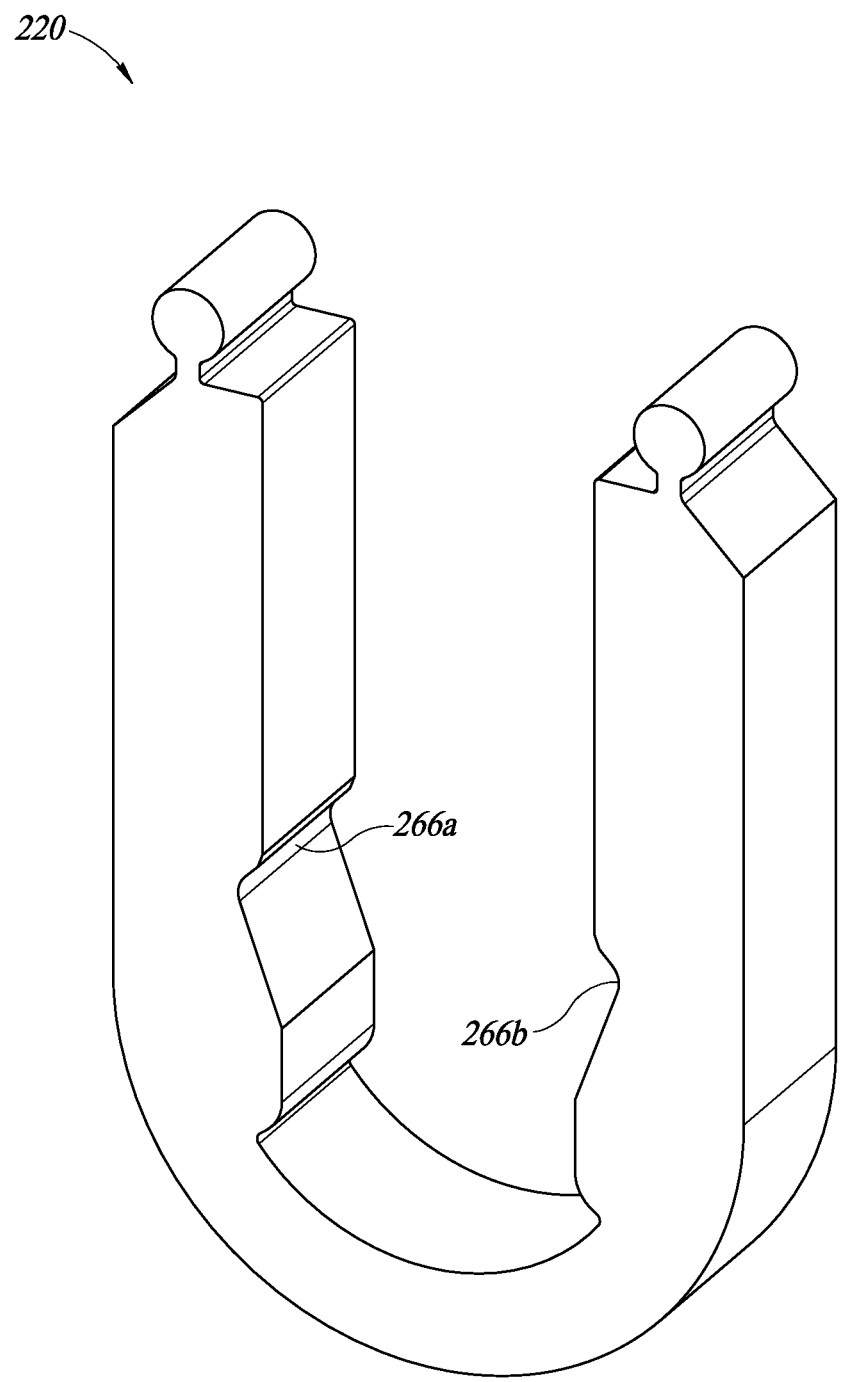
FIG. 27 illustrates a perspective view of a seal of the valve gate of FIGS. 19 and 22.

FIG. 27 illustrates the seal 220 by itself such that additional features thereof are revealed. As illustrated in FIG. 27, the seal 220 is largely the same as the first seal 120, but the seal 220 includes a first indentation 266a formed in an inner surface of a first longitudinally-extending portion thereof that corresponds to the first indentation 166a but is located at a slightly different position and oriented upside-down with respect to the indentation 166a, to accommodate the upside-down re-orientation of the levers 130 and a second indentation 266b formed in an inner surface of a second longitudinally-extending portion thereof that corresponds to the second indentation 166b but is located at a slightly different position and oriented upside-down with respect to the indentation 166b, to accommodate the upside-down re-orientation of the levers 130.

FIGS. 20, 23, and 25 illustrate additional details regarding the ways in which the various components of a valve gate including the alternative components engage and interact with one another. As illustrated in FIGS. 20, 23, and 25, when the valve gate is assembled, the various components of the valve gate may engage with one another in many of the same ways described herein with respect to the valve gate 104, with differences noted herein.

When assembled, a first curved end of a first one of the levers 130 is positioned within the first socket 234a formed in the terminal end portion of the first leg 254a of the movable body 218. Thus, the first one of the levers 130 can rotate, such as either frictionally or without friction by rolling against the curved surface of the first socket 234a, about an axis aligned with a central longitudinal axis of the pipeline 100 with respect to the other components of the assembled valve gate. Furthermore, a second curved end of the first one of the levers 130 opposite to the first curved end thereof and the socket 234a is engaged with and abuts against the outer side surface of the wedges 256a and 256d such that the wedges 256a and 256d extend between the second curved end of the first one of the levers 130 and the threaded rod 114. Additionally, the first one of the levers 130 is positioned such that an outer surface thereof is directly engaged with and abuts against an inner side surface of the seal 220, for example, such that the protrusion 150 of the first one of the levers 130 is seated snugly within the first indentation 266a of the seal 220.

Similarly, when so assembled, a first curved end of a second one of the levers 130 is positioned within the second socket 234b formed in the terminal end portion of the second leg 254b of the movable body 218. Thus, the second one of the levers 130 can rotate, such as either frictionally or without friction by rolling against the curved surface of the second socket 234b, about an axis aligned with a central longitudinal axis of the pipeline 100 with respect to the other components of the assembled valve gate. Furthermore, when the valve gate is assembled, a second curved end of the second one of the levers 130 opposite to the first curved end thereof and the socket 234b is engaged with and abuts against the outer side surface of the wedges 256b and 256c such that the wedges 256b and 256c extend between the second curved end of the second one of the levers 130 and the threaded rod 114. Additionally, the second one of the levers 130 is positioned such that an outer surface thereof is directly engaged with and abuts against an inner side surface of the seal 220, for example, such that the protrusion 150 of the second one of the levers 130 is seated snugly within the second indentation 266b of the seal 220.

To actuate and operate the valve gate, such as to move the valve gate into the pipeline 100 through the opening 110 and thereby begin to seal the pipeline 100, as described elsewhere herein, an operator can actuate the threaded rod 114 to rotate about its own central longitudinal axis by engaging other device(s) with the terminal end portion 144 of the threaded rod 114, including with the keyway 146 thereof. Actuating the threaded rod 114 to rotate about its own central longitudinal axis, as also described elsewhere herein, causes the nut 116 to travel along the length of the threaded rod 114 and its central longitudinal axis. Because the nut 116 abuts against a terminal end portion of the movable body 218 and the movable body 218 is free to move along the length of the threaded rod 114, causing the nut 116 to travel along the length of the threaded rod 114 also causes the movable body 218 to travel along the length of the threaded rod 114 and its central longitudinal axis.

While the valve gate is being moved into the pipeline 100 through the opening 110, and before a distal end of the valve gate comes into contact with a surface of the pipeline 100 opposite to the opening 110, causing movement of the movable body 218 along the length of the threaded rod 114 also causes the rest of the valve gate, including the seal 220, the levers 130, the upstream portion of the housing 222, and the downstream portion of the housing 224, to move along the length of the threaded rod 114 into the pipeline 100. Once the valve gate has been moved into the pipeline 100 through the opening 110 and the distal end of the valve gate comes into contact with the surface of the pipeline 100 opposite the opening 110, however, further distal movement of a distal portion of the seal 220, the upstream portion of the housing 222, and the downstream portion of the housing 224 is blocked or prevented by the engagement of the valve gate with the surface of the pipeline 100 opposite the opening 110.

Thus, at this stage, continued movement of the movable body 218 along the length of the threaded rod 114 causes the outer surfaces of the wedges 256a, 256b, 256c, 256d to exert forces against the second curved ends of the levers 130, which, when combined with the engagement of the first curved ends of the levers 130 with the sockets 234a, 234b, causes the levers 130 to pivot or rotate outward with respect to one another and with respect to the threaded rod 114 about their first curved ends engaged with the sockets 234a, 234b.

Such rotation may be without friction, in the sense that the curved surfaces of the levers 130 roll along, rather than slide along or rotate against, the curved surfaces of the sockets 234a, 234b.

Such outward rotation of the levers 130, combined with the engagement of the outer surfaces of the levers 130 with the inner surface of the seal 220, causes the portions of the seal 220 engaged with the levers 130 to move outward, thereby causing the overall profile of the valve gate when viewed along the central longitudinal axis of the pipeline 100 to expand, such as to a profile that is larger than the opening 110 in the pipeline 100. In particular, because the outer surfaces of the wedges 256a, 256b, 256c, and 256d exert forces against the levers 130 at locations farther from the sockets 234a, 234b than the locations at which the levers 130 engage with the inner surface of the seal 220, the forces applied by the levers 130 to the seal 220 are larger than the forces applied by the wedges 256a, 256b, 256c, 256d to the levers 130 and the travel of the portions of the seal 220 engaged with the levers 130 is smaller than the travel of the ends of the levers 130 engaged with the wedges 256a, 256b, 256c, 256d.

While the seal 220 is expanding radially outward with respect to the central longitudinal axis of the pipeline 100, and before the seal 220 fully engages with the inner surface of the pipeline 100 to form a complete seal therewith, continued movement of the movable body 218 along the length of the threaded rod 114 causes continued outward rotation of the levers 130 and continued expansion of the seal 220 radially outwards with respect to the central longitudinal axis of the pipeline 100. Once the seal 220 fully engages with the inner surface of the pipeline 100 and forms a complete seal therewith, however, further expansion of the seal 220 is blocked or prevented by the engagement of the seal 220 with the inner surface of the pipeline 100. At this stage, rotation of the threaded rod 114 can be ceased and the actuation of the valve gate to seal the pipeline 100 is complete. In this configuration, the valve gate is in an engaged, inserted, closed, and sealed position or configuration.

To actuate and operate the valve gate, such as to retract the valve gate by moving the valve gate out of the pipeline 100 through the opening 110, as described elsewhere herein, an operator can actuate the threaded rod 114 to rotate about its own central longitudinal axis by engaging other device(s) with the terminal end portion 144 of the threaded rod 114, including with the keyway 146 thereof, such that the threaded rod 114 rotates in a direction opposite to that used to insert the valve gate. Such rotation of the threaded rod 114 acts to move the components of the valve gate in directions opposite to those described above for the insertion of the valve gate. For example, in a first step, the seal 220 is retracted into the rest of the valve gate and the overall profile of the valve gate as viewed along the central longitudinal axis of the pipeline 100 decreases, such as to a profile that is smaller than the opening 110 in the pipeline 100. As another example, in a second step, the valve gate may be retracted from the pipeline 100 through the opening 110 therein. Such actions can be used to move the valve gate to a disengaged, retracted, withdrawn, open, and unsealed position or configuration. Inserting and retracting the valve gate to seal and unseal the pipeline 100 can be repeated as desired.

One advantage of the valve gates described herein is that they are configured to seal a variety of different pipelines even if those pipelines have different inside diameters, or even if a pipeline to be sealed has a variable inside diameter or an inside diameter that is not precisely known. In particular, because the valve gates described herein create a seal by expanding radially outward until they engage with an inner surface of the pipeline, the valve gates described herein can be expanded by an amount tailored to the specific inner diameter of the pipeline to be sealed, and even to the specific inner diameter at the specific location at which the pipeline is to be sealed.

For example, a single one of the valve gates described herein may be capable of sealing pipelines having inner diameters that range over at least one eighth of an inch, one quarter of an inch, or three eighths of an inch, such as without any changes made to the valve gate itself other than different amounts of expansion applied to the seal thereof. Furthermore, the valve gates described herein may be configured to seal pipelines having inner diameters between three inches and five inches, between five inches and seven inches, between seven inches and nine inches, between nine inches and eleven inches, between eleven inches and thirteen inches, between thirteen inches and fifteen inches, between fifteen inches and seventeen inches, between seventeen inches and nineteen inches, between nineteen inches and twenty one inches, between twenty one inches and twenty three inches, or between twenty three inches and twenty five inches.

The valve gates described herein have been described primarily in the context of live pipeline valve insertion, but the valve gates described herein can also be used in installed-in-place valves or valves that are initially installed in new pipeline systems, such as within a traditional wedge-style gate valve. In such embodiments, certain differences from the preceding description would apply. For example, in such embodiments, the valve gate may be oriented at 90 degrees with respect to the pipeline to be sealed as compared to its orientation with respect to the pipeline 100 illustrated and described above with respect to live pipeline valve insertion. Thus, in such embodiments, the valve gate may be configured such that an axis along which the seal of the valve gate expands is aligned with or parallel to a central longitudinal axis of the pipeline to be sealed, and/or such the valve gate may be configured to form a seal with at least a portion of an axially-facing end surface of the pipeline to be sealed. Furthermore, in such embodiments, a valve including the valve gate may also include a valve seat such that the terminal distal end of the valve gate engages with the valve seat when the valve is closed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A valve gate, comprising:
   a rod having a central longitudinal axis, a proximal end along the central longitudinal axis, and a distal end opposite the proximal end along the central longitudinal axis;
   a movable body coupled to the rod such that the movable body can move distally with respect to the rod;
   a seal;
   a first lever located between the rod and a first portion of the seal and engaged with the movable body and the first portion of the seal such that distal movement of the movable body drives the first lever to rotate and push the first portion of the seal outward away from the rod in a first direction transverse to the central longitudinal axis; and a second lever located between the rod and a second portion of the seal and engaged with the movable body and the second portion of the seal such that distal movement of the movable body drives the second lever to rotate and push the second portion of the seal outward away from the rod in a second direction transverse to the central longitudinal axis.

2. The valve gate of claim 1 wherein the first direction transverse to the central longitudinal axis is opposite to the second direction transverse to the central longitudinal axis.

3. A valve gate, comprising:
a rod having a central longitudinal axis, a proximal end along the central longitudinal axis, and a distal end opposite the proximal end along the central longitudinal axis;
a movable body coupled to the rod such that the movable body can move distally with respect to the rod;
a seal; and
a lever located between the rod and the seal and engaged with the movable body and a portion of the seal such that distal movement of the movable body drives the lever to rotate and push the portion of the seal outward away from the rod in a direction transverse to the central longitudinal axis.

4. The valve gate of claim 3 wherein the movable body includes a wedge and the lever is engaged with the wedge.

5. The valve gate of claim 3 wherein the movable body includes a curved surface and the lever is seated within the curved surface.

6. The valve gate of claim 3 wherein the lever is mounted on an axle.

7. The valve gate of claim 3 wherein the seal has a first end coupled to the movable body, a second end opposite the first end coupled to the movable body, and an intermediate portion between the first and second ends that wraps around a distal end of the valve gate.

8. The valve gate of claim 3 wherein the seal has a first end coupled to the movable body by a first shaft and a second end opposite the first end coupled to the movable body by a second shaft.

9. The valve gate of claim 3 wherein the rod is threadedly engaged with the movable body such that rotation of the rod in a first direction about the central longitudinal axis drives proximal movement of the movable body and rotation of the rod in a second direction opposite the first direction about the central longitudinal axis drives distal movement of the movable body.

10. The valve gate of claim 3 wherein distal movement of the movable body drives the lever to rotate about a fulcrum.

11. The valve gate of claim 10 wherein the fulcrum is located at a distal end of the lever.

12. The valve gate of claim 10 wherein the fulcrum is located at a proximal end of the lever.

13. The valve gate of claim 3 wherein distal movement of the movable body drives the lever to rotate about an axis transverse to the central longitudinal axis.

14. The valve gate of claim 3 wherein distal movement of the movable body drives the lever to rotate about an axis perpendicular to the central longitudinal axis.

15. The valve gate of claim 3 wherein the movable body is coupled to the rod such that the movable body can move in a direction parallel to the central longitudinal axis with respect to the rod.

16. The valve gate of claim 3, further comprising:
a first housing component that has an internal surface that faces toward a first side of the rod, a first side of the movable body, a first side of the seal, and a first side of the lever; and
a second housing component that has an internal surface that faces toward a second side of the rod opposite the first side of the rod, a second side of the movable body opposite the first side of the movable body, a second side of the seal opposite the first side of the seal, and a second side of the lever opposite the first side of the lever.

17. The valve gate of claim 16 wherein the first housing component includes a curved, proximal-facing surface that provides a fulcrum for the lever such that the lever is configured to pivot on the curved surface.

18. The valve gate of claim 16 wherein the first housing component includes a wedge engaged with the lever.

19. The valve gate of claim 18 wherein the wedge is located between the lever and the rod.

20. The valve gate of claim 16 wherein at least one of the first housing component and the second housing component has an external surface opposite the respective internal surface and a second seal coupled to the external surface such that when the valve gate is inserted into a pipeline through an opening cut into the pipeline, the second seal engages with a portion of the opening.

21. The valve gate of claim 20 wherein the portion of the opening is a downstream portion of the opening.

22. The valve gate of claim 16, wherein:
exactly one of the first housing component and the second housing component has an external surface opposite the respective internal surface and a second seal coupled to the external surface such that when the valve gate is inserted into a pipeline through an opening cut into the pipeline, the second seal engages with a portion of the opening; and
exactly one of the first housing component and the second housing component has an external surface opposite the respective internal surface and does not have a seal coupled to the external surface.

23. The valve gate of claim 3 wherein the movable body includes an undercut groove and the seal is securely retained within the undercut groove of the movable body.

24. The valve gate of claim 3 wherein the valve gate is configured to seal a first conduit having a first inner diameter and is configured to seal a second conduit having a second inner diameter, wherein the first inner diameter is different than the second inner diameter.

25. The valve gate of claim 24 wherein the valve gate is configured to seal conduits having any inner diameter between the first inner diameter and the second inner diameter.

26. The valve gate of claim 24 wherein the valve gate is configured to be inserted into the first conduit through a first opening in the first conduit, wherein the first opening has a third inner diameter smaller than the first inner diameter, and the valve gate is configured to be inserted into the second conduit through a second opening in the second conduit, wherein the second opening has a fourth inner diameter smaller than the second inner diameter.

27. The valve gate of claim 24 wherein the first inner diameter is greater than the second inner diameter by at least one eighth of an inch.

28. The valve gate of claim 24 wherein the first inner diameter is greater than the second inner diameter by at least one quarter of an inch.

29. The valve gate of claim 3 wherein the valve gate is located inside a body mounted on a pipeline within which a valve is to be installed.

30. The valve gate of claim 3 wherein the valve gate is configured to seal a conduit having a second central longitudinal axis such that the direction transverse to the central longitudinal axis of the rod is transverse to the second central longitudinal axis of the conduit.

31. The valve gate of claim 3 wherein the valve gate is configured to seal a conduit having a second central longitudinal axis such that the direction transverse to the central longitudinal axis of the rod is aligned with the second central longitudinal axis of the conduit.

32. The valve gate of claim 3 wherein the valve gate is configured to form a seal with at least a portion of a radially-facing inner circumferential surface of a pipe.

33. The valve gate of claim 3 wherein the valve gate is configured to form a seal with at least a portion of an axially-facing end surface of a pipe.

* * * * *